United States Patent [19]
Suzuki et al.

[11] Patent Number: 6,067,243
[45] Date of Patent: May 23, 2000

[54] AC-AC/DC CONVERTER

[75] Inventors: Yasunobu Suzuki, Koganei; Isao Sugawara, Warabi, both of Japan

[73] Assignees: I-Hits Laboratory Corporation, Yokohama; Chiyoda Corporation, Warabi, both of Japan

[21] Appl. No.: 09/194,916

[22] PCT Filed: Jun. 6, 1996

[86] PCT No.: PCT/JP96/01538

§ 371 Date: Mar. 18, 1999

§ 102(e) Date: Mar. 18, 1999

[87] PCT Pub. No.: WO97/47070

PCT Pub. Date: Dec. 11, 1997

[51] Int. Cl.$^7$ .............................................. H02M 7/5387
[52] U.S. Cl. .......................................... 363/132; 363/127
[58] Field of Search .............................. 363/17, 163, 132, 363/127; 323/355, 363

[56] References Cited

U.S. PATENT DOCUMENTS

| | | |
|---|---|---|
| 3,517,300 | 6/1970 | McMurray . |
| 3,564,390 | 2/1971 | Stratton . |
| 5,255,174 | 10/1993 | Murugan ................................. 363/17 |
| 5,570,279 | 10/1996 | Venkataramanan ..................... 363/127 |

FOREIGN PATENT DOCUMENTS

| | | |
|---|---|---|
| 0 618 667 A1 | 10/1994 | European Pat. Off. . |
| 3-15913 | 1/1991 | Japan . |
| 5-122935 | 5/1993 | Japan . |
| 7-255172 | 10/1995 | Japan . |

*Primary Examiner*—Shawn Riley
*Attorney, Agent, or Firm*—Jacobson, Price, Holman & Stern, PLLC

[57] ABSTRACT

An AC-AC/DC converter for converting an AC input or an AC input voltage-divided by a capacitor into a high frequency AC. The converter includes a modulator for turning bi-directional AC switches on and off to convert the AC input or the AC input voltage-divided by the capacitor into a high frequency AC; a high frequency transformer for varying a voltage ratio of the high frequency AC; bi-directional AC switches for demodulating an output from the high frequency transformer into an AC output or rectifying the output into a DC output; a high frequency filter for removing high frequency components from the AC or DC output; and a control unit for controlling the AC switches using a pulse width or pulse phase modulation technique. Through the bi-directional AC switches, the converter can sequentially control an AC or DC input such that the AC or DC output has a value in a range from a maximum value of the positive phase or polarity, passing through zero, to the maximum value of the negative phase or polarity.

14 Claims, 26 Drawing Sheets

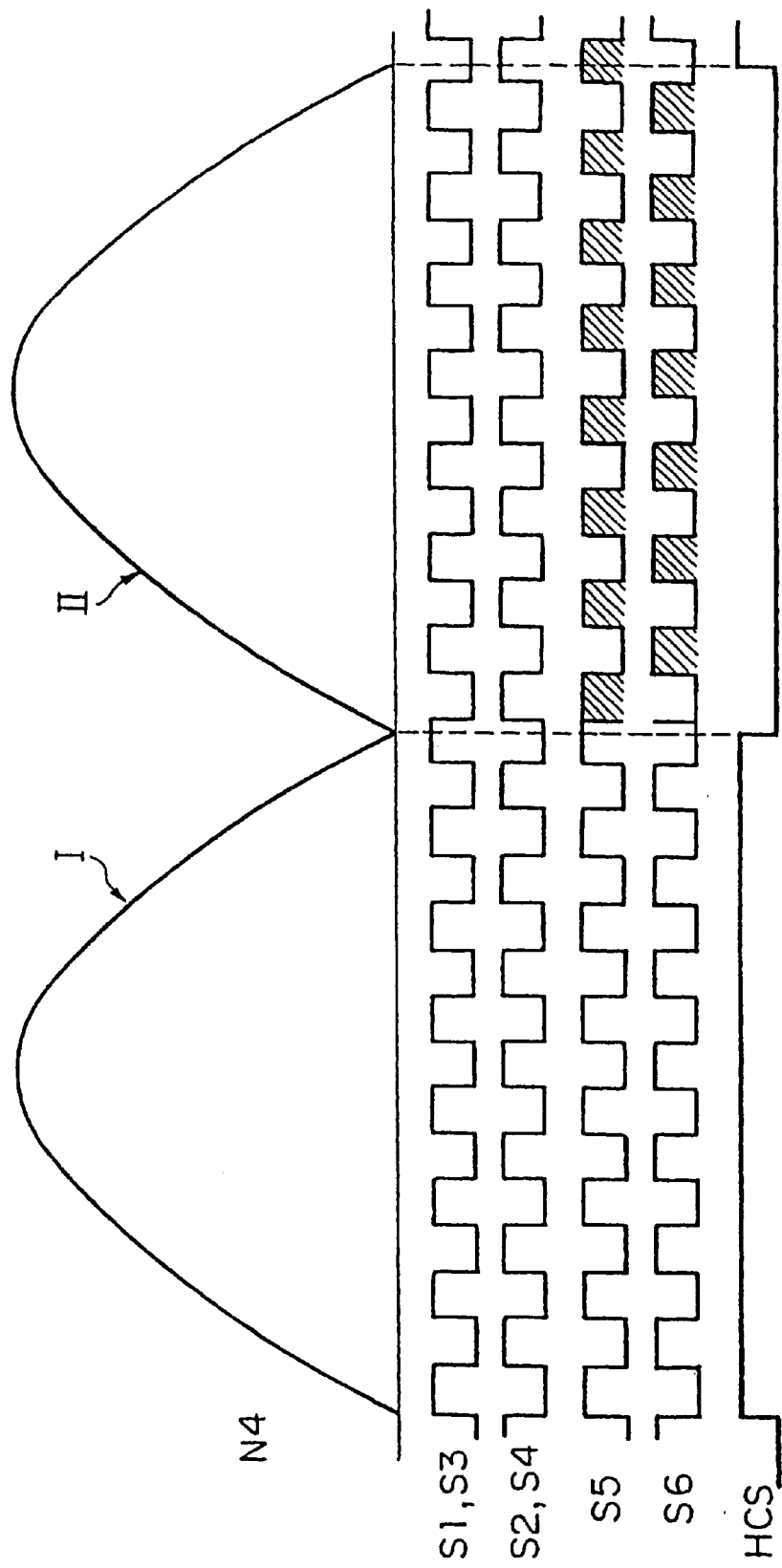

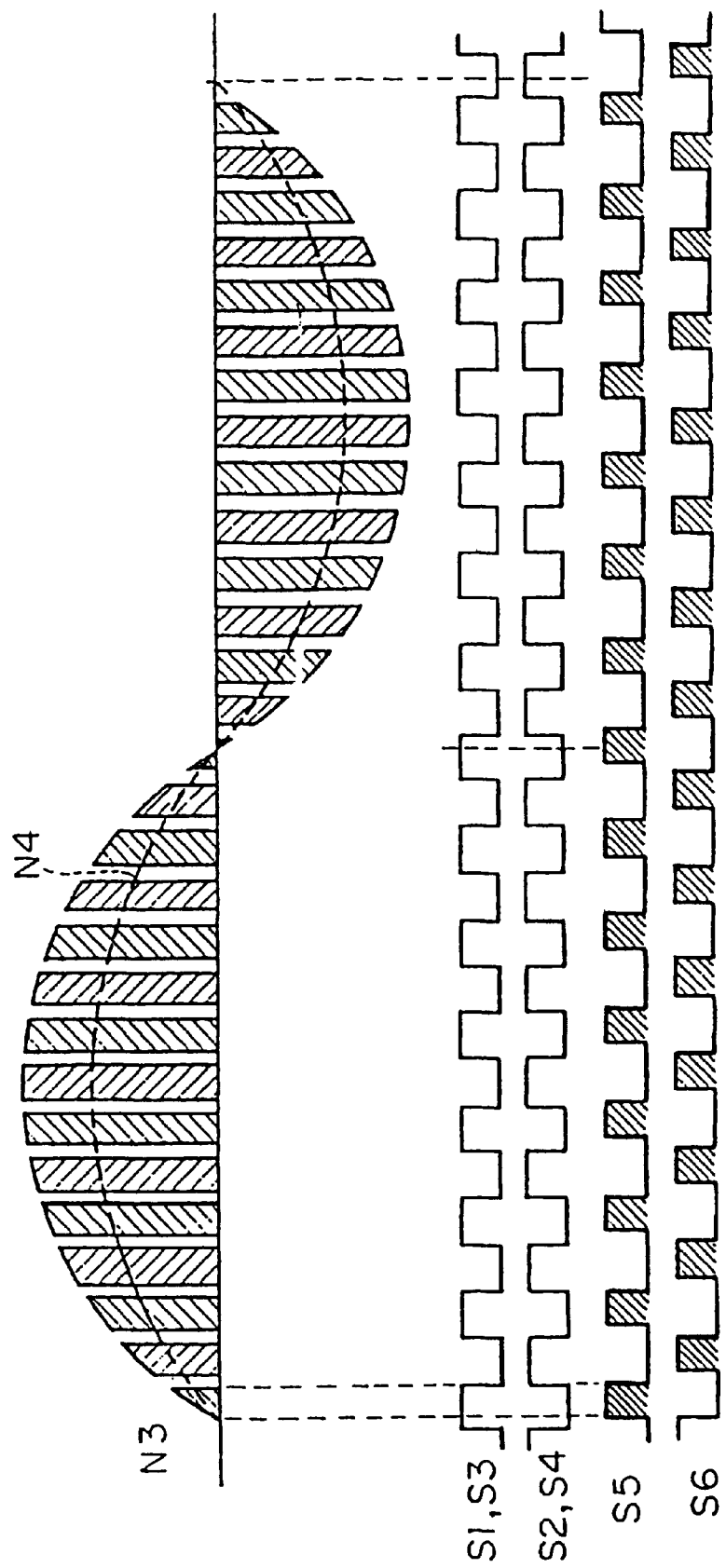

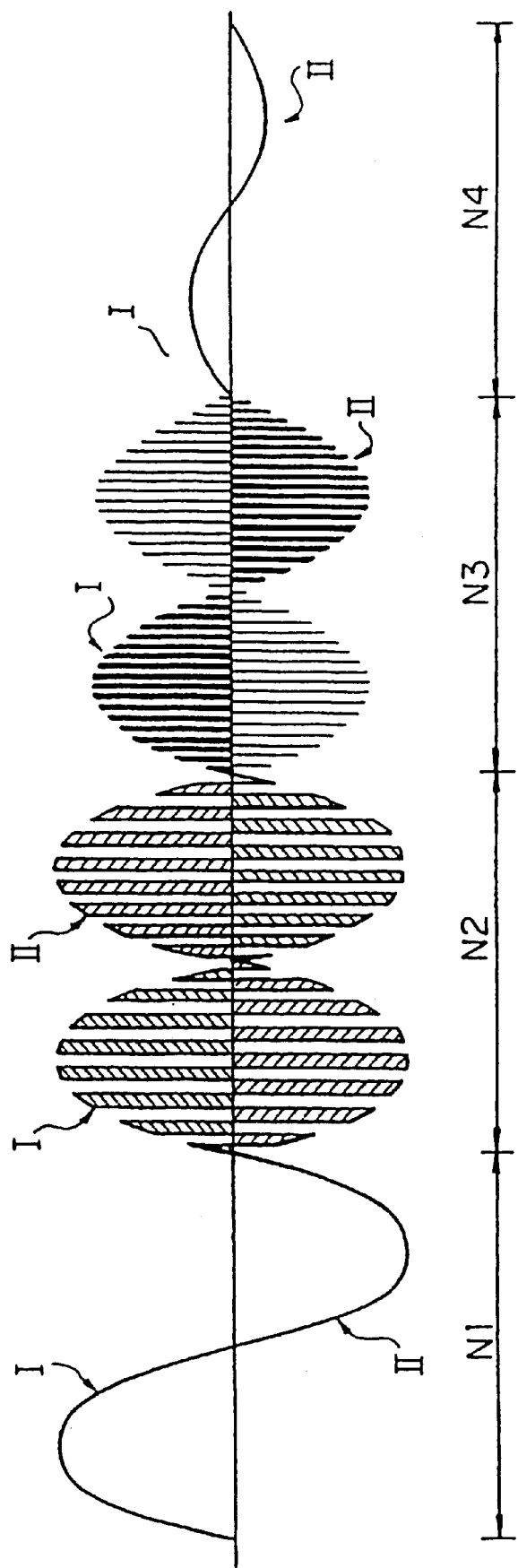

AC-AC/DC CONVERTER

TECHNICAL FIELD

The present invention relates to an AC/AC converter having the function of converting voltage/current of electrical energy, that is widely used in various electronic devices, domestic appliances, personal power generators, various industrial installations, and power generators etc.

Technical Background

A transformer such as that shown in FIG. 21, for example, is generally used as an AC transformer, which is a conventional AC/AC converter. However, this type of transformer has an output voltage regulated by a turns ratio of a primary winding to a secondary winding, which means that it is difficult to obtain an arbitrary voltage. Moreover, there is also a problem that because the main materials for such a transformer are iron and copper, it becomes extremely heavy and large in size.

On the other hand, there have been various suggestions for AC control devices having AC input and AC output that use semiconductor elements, but the devices shown in FIG. 22 and FIG. 23 are known.

In FIG. 22, reference numeral 11 is a rectifier, reference numeral 12 is a smoothing circuit, reference numeral 13 is an inverter, reference numeral 14 is a high frequency filter, and reference numeral 15 is a step-up transformer. In a device having such a structure, an AC input is rectified to DC by the rectifier 11, ripple components are removed by the smoothing circuit 12, output from the smoothing circuit 12 is subjected to high speed switching processing in the inverter 13 using well known PWM (pulse width modulation) control, turned back into low frequency AC by the high frequency filter 14, and converted as necessary to a desired voltage by the step-up transformer 15.

Also, in the device of FIG. 23, an AC input is rectified by a rectifier 11, an output of a smoothing circuit 12 is input to a power amplifier 16 and made into AC of a desired power, and converted to a desired voltage as required by the step-up transformer 15.

Such AC control devices enable high speed control, for example, for an input fluctuation of ±20% in a 100V AC input, an output of 100V ±0.1% is possible.

However, because input AC is temporarily converted to DC and then re-converted to AC, the circuit structure is complicated, re-converted AC becomes less reliable and conversion efficiency is bad. Also, because the step-up transformer 15 is a low frequency transformer, it becomes heavy and large in size, and there is a problem that it is difficult to reduce the size or weight of a device.

SUMMARY OF THE INVENTION

The object of the present invention is to provide a high reliability AC/AC converter that is small in size and light in weight.

The present invention provides an AC-AC/DC converter in which an AC input or an AC input voltage-divided by a capacitor is converted into a high frequency AC by a control unit which turns on and off AC switches operable bi-directionally in the forward and reverse directions. The high frequency AC is applied to a primary winding of a high frequency transformer including primary and secondary windings. The high frequency AC induced at the secondary winding is demodulated into an AC output or is rectified into a DC output by turning on and off the bi-directional AC switches under the control of the control unit. The demodulated AC output or rectified DC output is supplied to a load via a high frequency filter.

The control unit can sequentially control a voltage of an AC or DC output to have a value in a range from a maximum value of a positive phase or polarity, passing through zero, to a maximum value of a negative phase or polarity, using a pulse phase modulation control technique in which a phase of a driving pulse at a demodulation side switch is varied in accordance with a phase of a driving pulse of AC switches for modulating the AC input into a high frequency AC.

BRIEF DESCRIPTION OF THE DRAWINGS

FIG. 5A is a drawing showing control signals of each of the AC switches for the operation of FIG. 4.

FIG. 7A is a drawing showing control signals of each of the AC switches for the operation of FIG. 6.

FIG. 8 is a drawing showing waveforms at each of the points N1–N4 in the circuit of FIG. 1A for an AC/AC converter of a fourth embodiment of the present invention.

DETAILED DESCRIPTION OF THE PREFERRED EMBODIMENTS

An AC/AC converter of the present invention will now be described below with reference to drawings showing embodiments of the present invention.

Figure 1A:
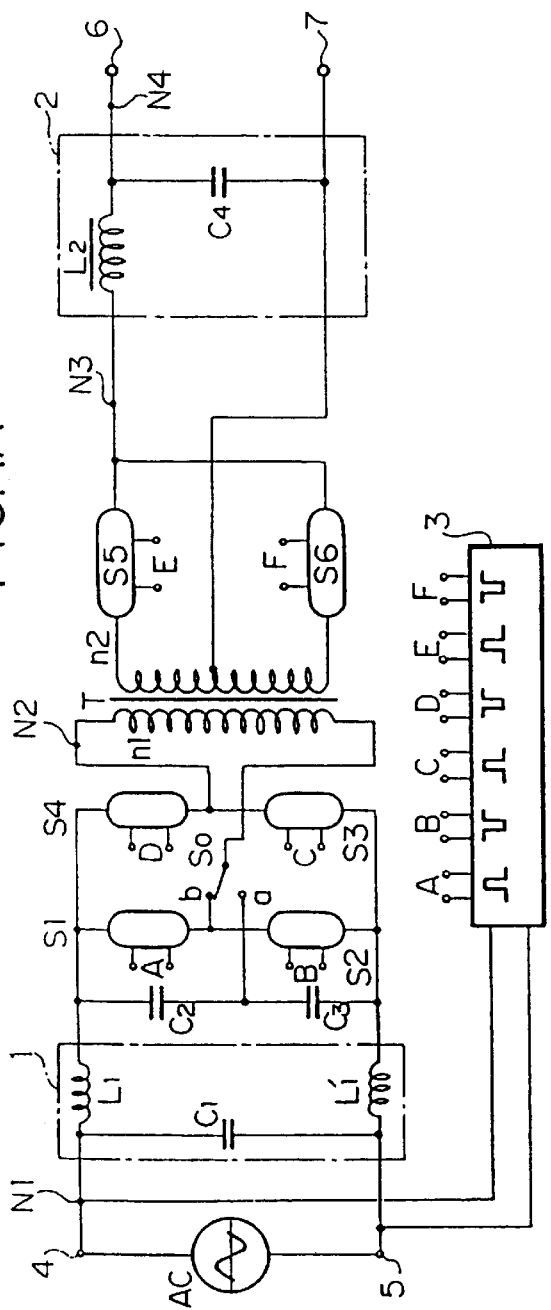
FIG. 1A is a circuit diagram showing the basic structure of an AC/AC converter of a first embodiment of the present invention.

FIG. 1A is a circuit diagram of an AC/AC converter of the first embodiment of the present invention. In FIG. 1A, AC is an input AC supply, reference numeral 1 is an input filter, reference numeral 2 is an output filter, reference numeral 3 is control means, reference numeral S1 is a first AC switch, S2 is a second AC switch, S3 is a third AC switch, S4 is a fourth AC switch, S5 is a fifth AC switch, S6 is a sixth AC switch and S0 is an output switch taken as switch means.

Next, the circuit connection will be described. One end 4 and another end 5 of the input terminals are respectively connected to one end of an inductor L1 and one end of a capacitor C1, or one end of an inductor L1' and the other end of the capacitor C1, being input terminals of an the input filter 1, and also connected to control means 3 for operating a timing detector and the first to sixth AC switches S1–S6. The other end of the inductor L1 at one output of the input filter 1 is connected to one end of capacitor C2, and one end of the first AC switch S1 and the fourth AC switch S4, while the other end of the inductor L1' at the other end of the input filter 1 is connected to one end of the capacitor C3 and one end of the second AC switch S2 and the third AC switch S3. The other ends of the capacitor C2 and the capacitor C3 are connected to each other, as well as to contact a of a switch S0. The other end of the fourth AC switch S4 and the other end of the third AC switch S3 are connected together and also connected to one end of the primary winding n1 of the transformer T1, while the other end of the first AC switch S1 and the second AC switch S2 are connected together and also connected to contact b of the switch S0. A common terminal of the switch S0 is connected to the other end of the primary winding n1 of the transformer T1. In the example in the drawing, the output switch S0 is connected to the side of the contact b. Also, control terminals A–F of each of the AC switches S1–S6 are respectively connected to control outputs A–F handled by control means 3.

One end of the secondary winding n2 of the transformer T1 is connected to one end of the fifth AC switch S5, while the other end of the secondary winding n2 is connected to one end of the sixth AC switch S6. The other ends of the fifth AC switch S5 and the sixth AC switch S6 are respectively connected together and also connected to one end of an inductor L2 at one end of the output filter 2, while the center point of the secondary winding of the transformer T1 is connected to the other end of a capacitor C4 at the other end of the output filter 2 and also connected to another output terminal 7 through another output of the output filter 2. The other end of the inductor L2 of the output filter 2 is connected to one end of the capacitor C4, and also to output terminal 6 through one output of the output filter 2.

Figure 2:
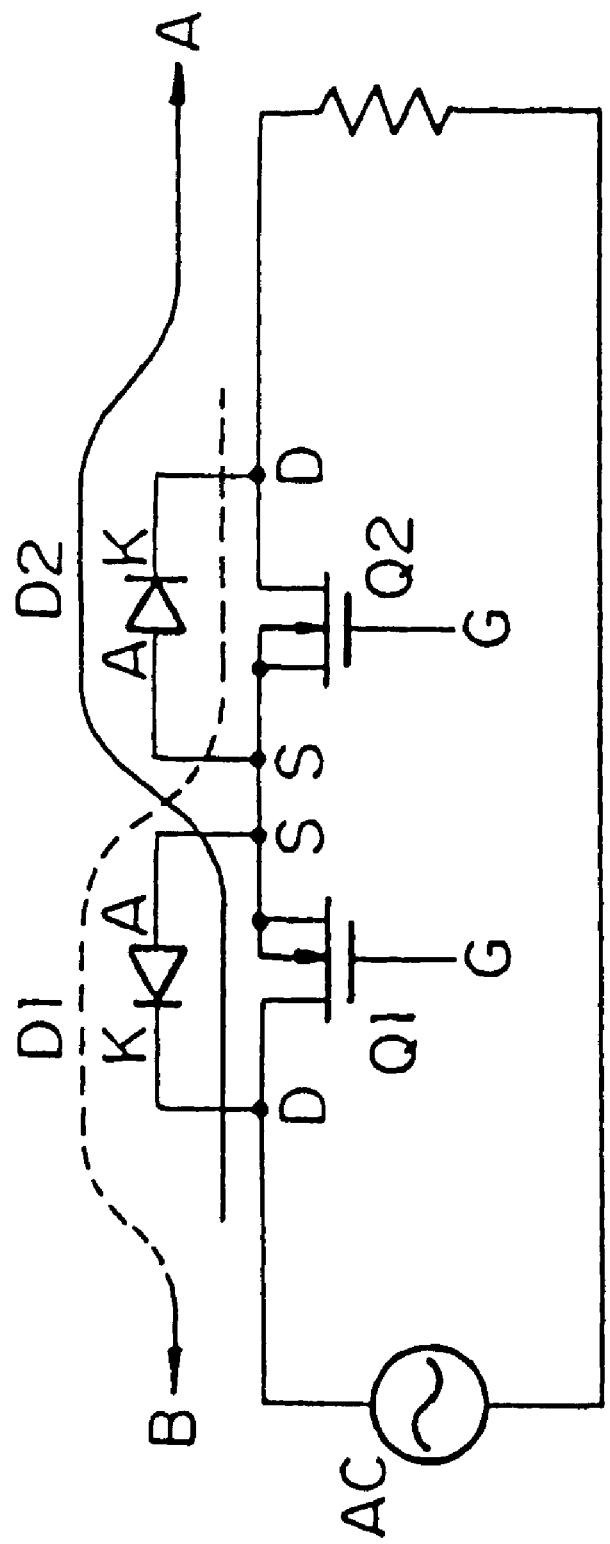
FIG. 2 is a drawing showing a structural example of an AC switch.

A specific structural example of each of the AC switches S1–S6 is shown in FIG. 2. In the drawing, Q1 and Q2 are semiconductor elements, and D1 and D2 are diodes. In this example, n channel MOSFETs are used in the semiconductor elements, which means that source electrodes of one polarity, being one of the terminals to be controlled of the semiconductor elements, are connected together, and alternating current AC is applied between the drains, being terminals to be controlled of another polarity. Also, the diodes D1 and D2 are connected across the terminals to be controlled (D, S) of the n channel MOSFETs in the semiconductor elements Q1 and Q2, in the reverse direction to the conducting direction (which is drain to source). That is, the cathodes of the diodes are respectively connected to the drain side of each FET, and the anodes are respectively connected to the source sides. By inputting a common control signal to the gates, which are control terminals of the semiconductor elements Q1 and Q2, it is possible to control alternating current. Namely, if each FET is turned on, current flows through the path shown by arrow A from D to S of Q1 to D2 (or from S to D of Q2) in a half cycle of the alternating current, and in the next half cycle current flows through the path shown by arrow B from D to S of Q2 to D1 (or from S to D of Q1). The diodes D1 are not essential, and it is possible to obtain the same effects using the characteristics of semiconductor elements Q1 and Q2 depending on voltage resistance, current capacity, etc.

Next, the operation of an AC/AC converter having the above described structure will be described. Positive phase drive pulses for the AC switches S1, S3 and S5, and negative phase drive pulses for the AC switches S2, S4 and S6 are respectively supplied from the control means 3. If alternating current is input to the input terminals 4 and 5 of the AC/AC converter, an alternating voltage is respectively applied to one end of the AC switches S1 and S3, and one end of the AC switches S2 and S4, through the input filter 1. Each of the AC switches S1–S4 is repeatedly switched between S1 and S3 being ON while S2 and S4 are OFF, and vice versa, as described above. When the ON OFF cycles arc of sufficiently high frequency compared to the frequency of the input AC power supply, AC current alternately flows via two paths having different directions for the transformer T, namely either path (1) AC switch S1 to transformer T to AC switch S3, or path (2) AC switch S4 to transformer T to AC switch S2. A half cycle of a commercial cycle is converted to high frequency bipolar. Namely, conversion is made to high frequency power that has been envelope modulated with the commercial cycle. An AC input that has been converted to high frequency in this way is applied to the primary winding n1 of the transformer T, and transferred to the secondary winding n2.

The secondary winding n2 of the transformer T has its two ends respectively connected to the fifth AC switch S5 and the sixth AC switch S6, and the other ends of these two AC switches S5 and S6 are connected together and input to the output filter 2 as one output. Also, the center point of the secondary winding n2 of the transformer T is input to the output filter 2 as another output. Here, AC switch S5 operates in synchronism with AC switches S1 and S3, and AC switch S6 operates in synchronism with AC switches S2 and S4. That is, they operate so that electric current always flows in only one direction in an AC half cycle. Accordingly, an AC input waveform that has been converted to high frequency by AC switches S1 and S3, or AC switches S2 and S4, is made into a waveform that approximates to or resembles the input AC voltage, by inverting the waveform in one direction and reconstituting it. That voltage is set to an arbitrary voltage according to the turns ratio of the transformer T, and high frequency components are removed by the output filter 2, and it is possible to obtain a desired voltage current waveform output that follows an input waveform from the output terminals 6 and 7.

Figure 1B:
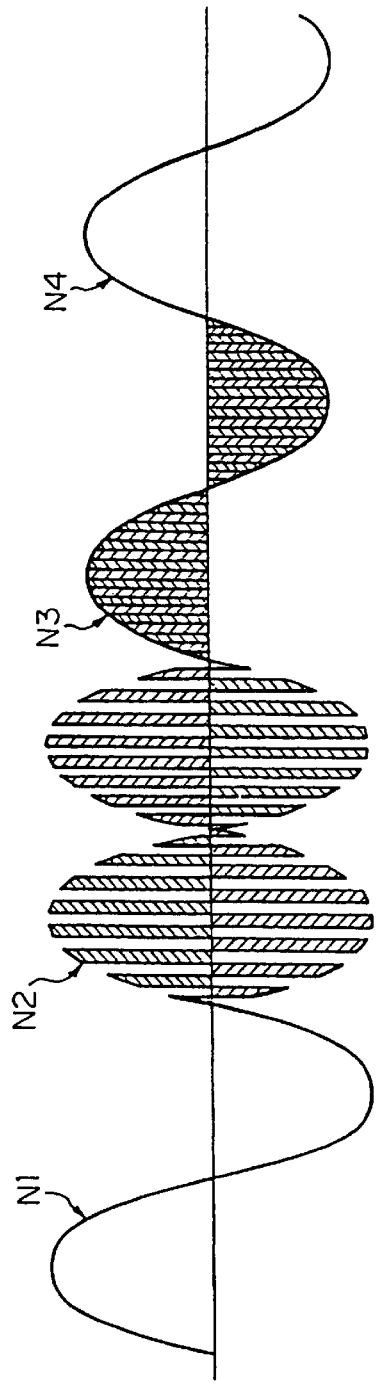
FIG. 1B is a drawing showing waveforms at each of points N1–N4 in FIG. 1A.

Waveforms of each section of an AC/AC converter operating in this way are shown in FIG. 1B. In this drawing, N1–N4 are waveforms at nodes N1–N4 in FIG. 1A.

Figure 3A:
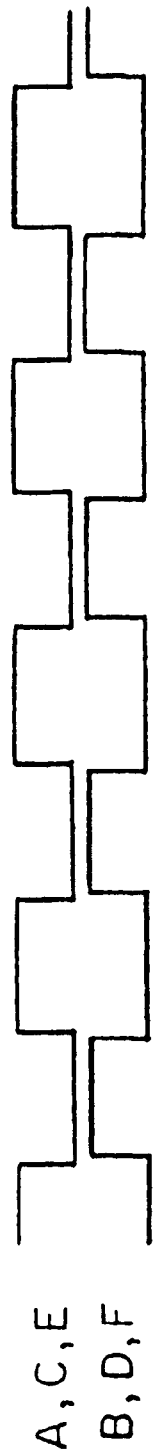
FIG. 3A is a drawing showing control signals for each of the AC switches in FIG. 1A.

FIG. 3A shows control signals supplied from output terminals A–F of the AC/AC converter control means 3 to control terminals A–F corresponding to each of the AC switches S1 to S6, and in order to achieve the specific operation in this example, positive pulses applied to terminals A, C and E, and negative pulses applied to terminals B, D and F are respectively pulse waveforms having a duty cycle of approximately 50%.

Figure 3B:
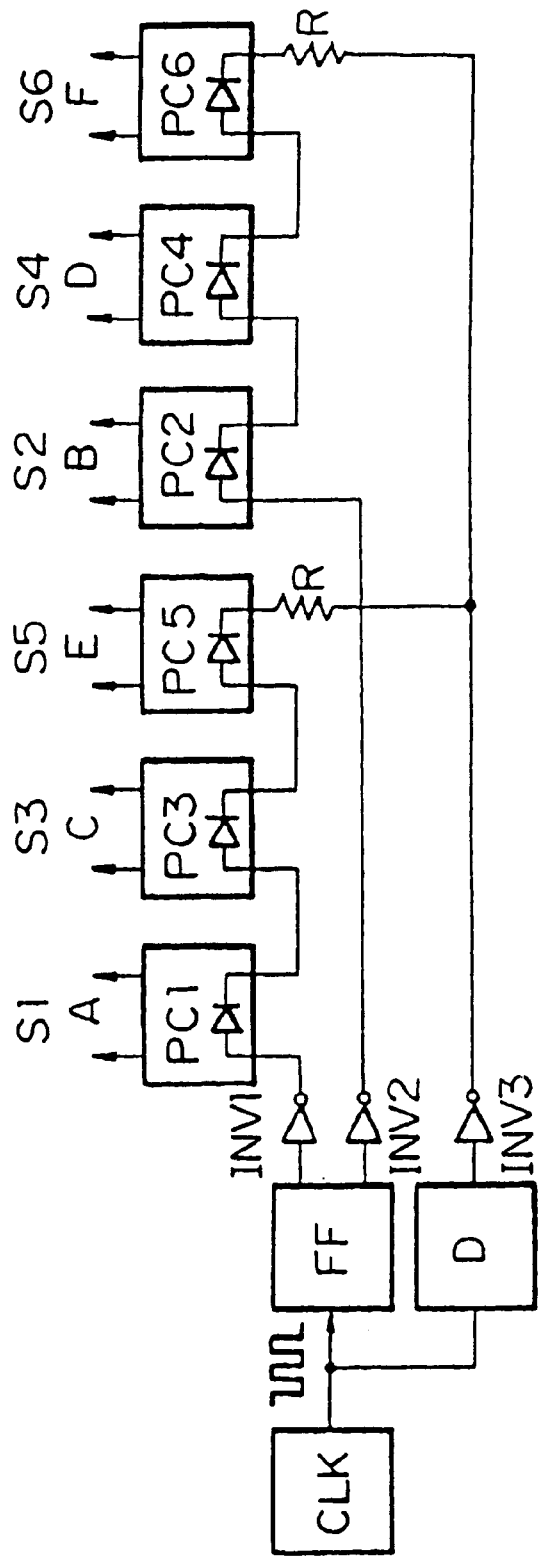
FIG. 3B is a block diagram showing a specific structural example of control means for generating control signals such as those shown in FIG. 3A.

FIG. 3B shows a structural example of control means 3 for generating these type of control signals, and in the drawing CLK is a clock signal generator, FF is a flip-flop, D is a D-type flip flop, INV1–INV3 are inverters, and PC1–PC6 are photo couplers. However, a clock signal generated by the clock signal generator CLK is made into pulses of respective positive and negative phase by the flip-flop FF, and supplied to the photo couplers PC1, PC3 and PC5, or photo couplers PC2, PC4 and PC6. The clock signal from the clock signal generator CLK is supplied to the D-type flip flop, delayed by one pulse and drives each of the photo couplers as an inverted clock signal through the inverter INV3 together with the flip-flop signals. This is one example of such a circuit structure, but as long as the AC switches S1–S6 are controlled at the above described timing, it is also possible to be constituted, for example, by an IC for PWM control, or a CPU and peripheral devices and a control program, etc.

The relationship between the clock frequency in the above described control means 3 and the transformer T will now be described. In conversion of an input AC waveform to high frequency by the AC switches S1 and S3, and AC switches S2 and S4, if a voltage applied to the transformer T is V, frequency is f, number of turns of the coil is N, core sectional area is A and maximum magnetic flux density is Bm, then $$V = 4 \cdot N \cdot A \cdot Bm$$

and with the same applied voltage, if the frequency is 1000 times higher (for example, 50 kHz for 50 Hz) the number of turns N, core sectional area A and maximum magnetic flux density Bm can respectively be reduced to a tenth. As a result, it is possible to use a transformer that is extremely small in size and lightweight, and which has low power loss. Also, by converting to a voltage according to the turns ratio, it is possible to convert AC energy into an arbitrary voltage or current.

Next, the operation will be described for the case when the output switch S0 is connected to the side of contact a. As described above, the contact a of the output switch S0 is connected between the capacitors C2 and the capacitor C3 connected in series. If these two capacitors C2 and C3 have the same capacitance, a potential at the connection point a of the output switch S0 becomes half the input voltage. Accordingly, when the output switch S0 is connected to the side of contact a, the virtual input becomes half, and the output voltage also becomes half. In this case, the AC switches S1 and S2 are not used. Therefore, in the case where voltage division is carried out using only the capacitors C2 and C3, these AC switches S1 and S2 can be omitted.

The basic structure and operation of the AC/AC converter of the present invention has been described above, and applications of such an AC/AC converter will now be described.

Figure 4:
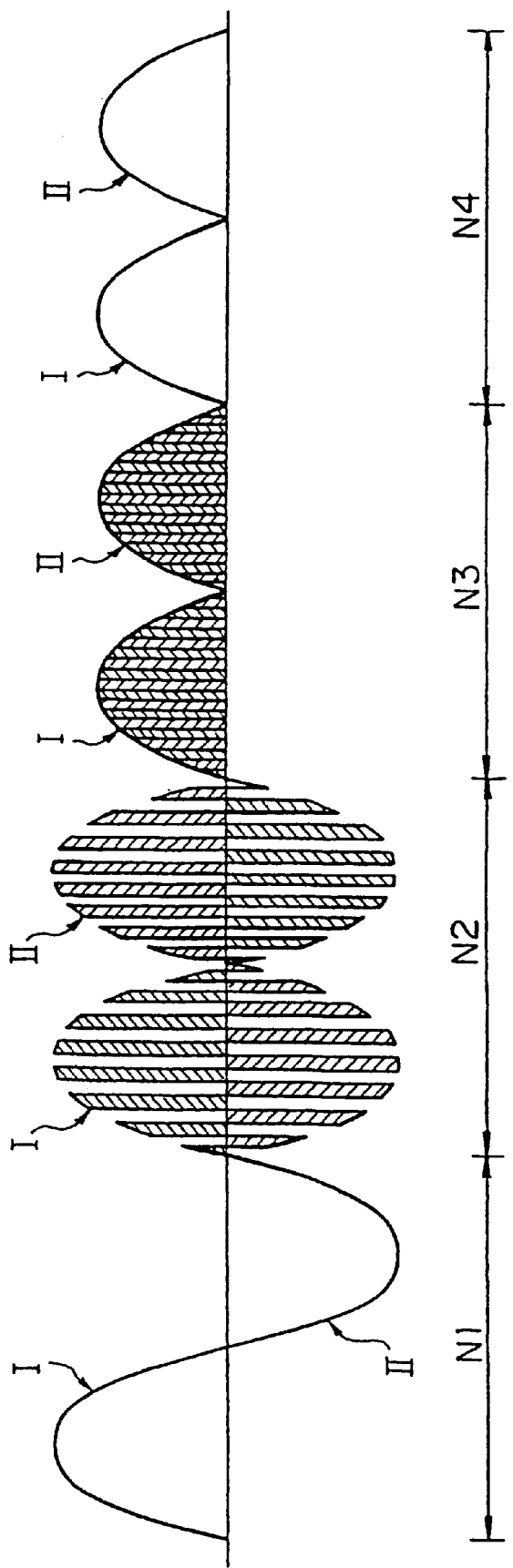
FIG. 4 is a drawing showing waveforms at each of the points N1–N4 in the circuit of FIG. 1A for an AC/AC converter of a second embodiment of the present invention.

FIG. 4 is a drawing showing waveforms at each section of a second embodiment of the present invention. The main circuit structure is the same as the circuit of FIG. 1, and so description thereof will be omitted. In this example, waveforms at each of nodes N1 and N2 are the same as in the first embodiment, and the difference is that with respect to the waveform at nodes N3 and N4, the second half cycle of the AC waveform (II) is inverted to give direct current (pulsating current).

FIG. 5A is a drawing showing output waveform timing of control signals of the control means carrying out the above described operation, and node N4. The operation of the fifth AC switch S5 and the sixth AC switch S6 in reversed by a discrimination signal HCS for discriminating the first half cycle (I) and the second half cycle (II) of the input signal. In this way, by reversing the operation of the AC switches S5 and S6 in the second half cycle (II) of the input signal the conducting direction during that half cycle (II) is always reversed, and as a result the output waveform has the same polarity in the first half cycle (I) and the second half cycle (II) and direct current is output.

Figure 5B:
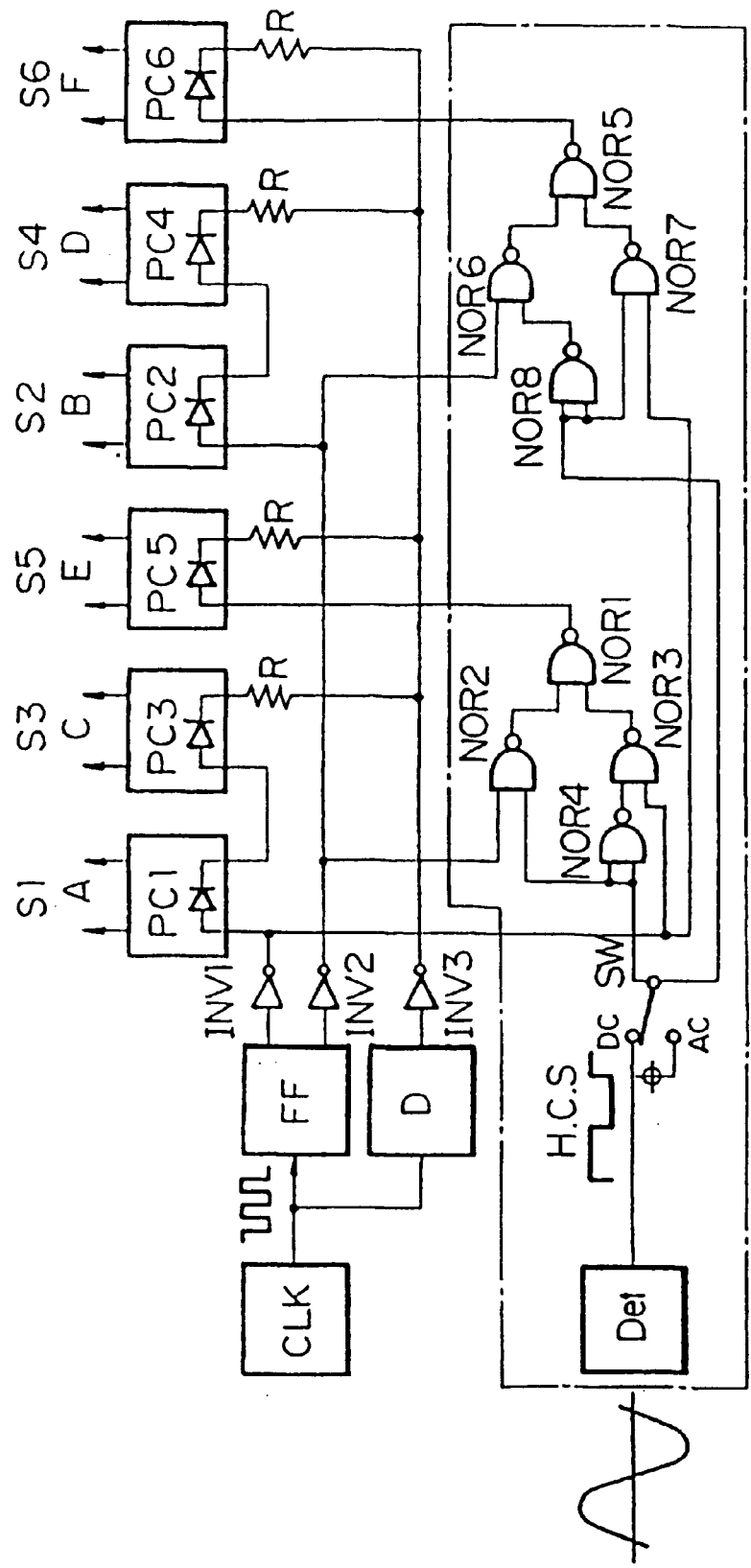
FIG. 5B is a block diagram showing a specific structural example of control means for generating control signals such as those shown in FIG. 5A.

FIG. 5B is a drawing showing a structural example of the control means 3 for supplying the above described control signals. The first half cycle and the second half cycle of the input signal are detected by a detector Det to output the discrimination signal HCS. Signals INV1 or INV2, which are positive logic or negative logic output signals from the flip flop FF, are selected by NOR gates 1–4 or NOR gates 5–8 using this discrimination signal HCS, to drive photo coupler PC5 or photo coupler PC6. The switch SW is a switch for selecting whether this type of DC output operation is carried out or the AC output operation of the first embodiment is carried out, and at the time of AC output is always at a high level, the discrimination signal HCS is not input to the NOR gate 4 and the NOR gate 8 to give normal operation. The rest of the structure is the same as that of the circuit in FIG. 3B, so the same structural elements have the same reference numerals attached, and description thereof is omitted.

Figure 6:
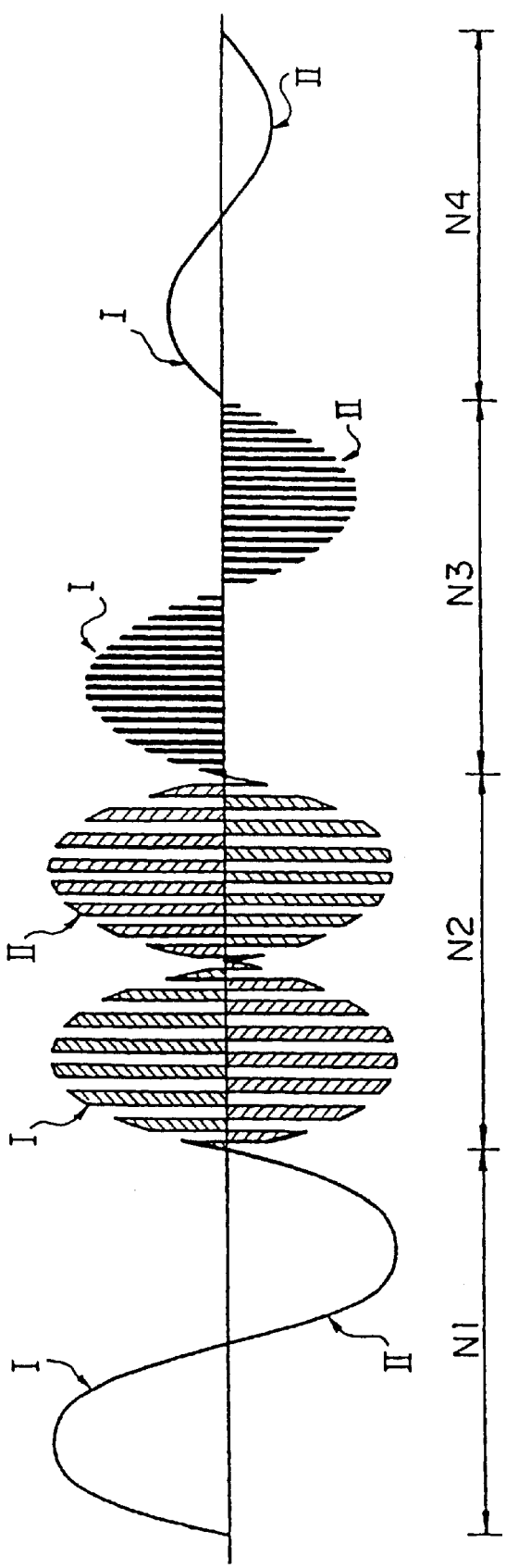
FIG. 6 is a drawing showing waveforms at each of the points N1–N4 in the circuit of FIG. 1A for an AC/AC converter of a third embodiment of the present invention.

FIG. 6 is a drawing showing waveforms at each part in the third embodiment of the present invention. The main circuit structure is the same as the circuit of FIG. 1A and description thereof is omitted. In this example, waveforms at each of node N1 and node N2 are the same as in the first embodiment, but with respect to the waveform at node N3, the pulse width of each of the high frequency components when the AC waveform is restored is reduced and there is a period where current does not flow between each pulse, which means that the output waveform at node N4 is a lower (reduced) waveform than the input voltage (current) corresponding to the time that current does not flow in node N3. That is, duty cycle control of the AC switches S5 and S6 is carried out.

FIG. 7A, is a drawing showing the relationship between the control signals of the control means 3 for carrying out the above operation and the waveform of node N3. The waveform shown by a dotted line overlapping the waveform of node N3 is the output waveform of node N4. As is clear from the drawing, there is phase shift between the control signals of AC switches S1 and S3, and the control signal of AC switch S5, or between the control signals of AC switches S2 and S4 and the control signal of AC switch S6, and the period for which AC switch S5 and AC switch S6 are ON is reduced. Namely, for AC switches S1 and S3, or AC switches S2 and S4, the control signal of AC switch S5 or AC switch S6 is delayed by a fixed time, and the ON period is reduced. Accordingly, a pulse waveform appears at node N3 only in a period when AC switches S1 and S3 and AC switch S5 are active together, or when AC switches S2 and S4 and AC switch S6 are active together (in the drawing, portions of the control signals S5 and S6 shown with diagonal lines). In this case, if the drive pulses of the AC switches S5 and S6 are delayed by 60°, the output becomes ⅔, while if the drive pulses are delayed by 180° the output becomes zero.

Figure 7B:
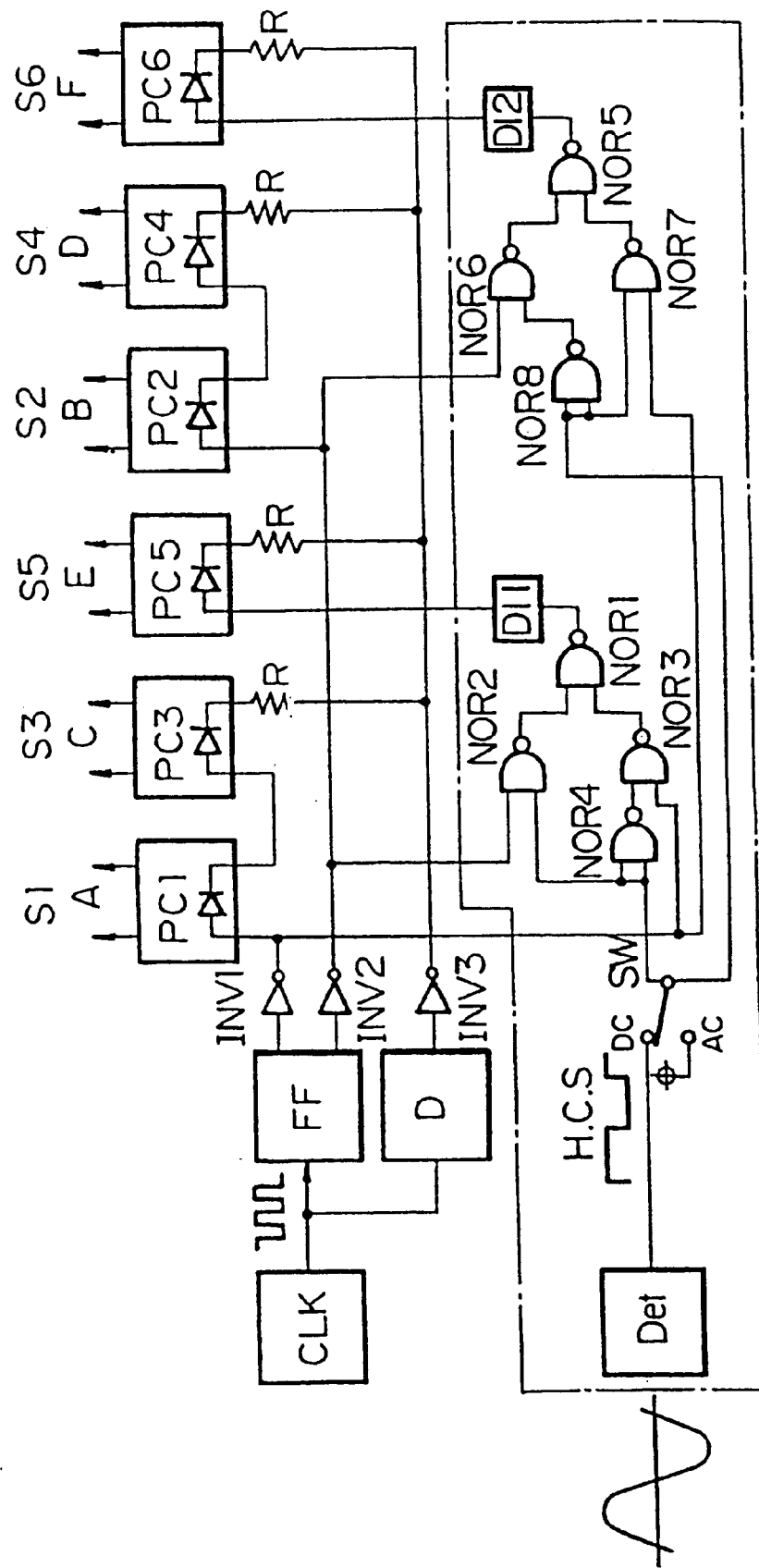
FIG. 7B is a block diagram showing a specific structural example of control means for generating PWM control signals such as those shown in FIG. 7A.

FIG. 7B is a drawing showing a structural example of the control means 3 for supplying the above described control signals. Delay circuits DL1 and DL2 are respectively provided at the outputs of the NOR gates 1 and 5 of the circuit in FIG. 5B, but the remainder of the structure is the same as the circuit of FIG. 5, so description thereof will be omitted. This example has a structure with delay circuits DL1 and DL2 provided in the circuit of FIG. 5, but any structure is sufficient as long as the duty cycle of the control signals of AC switches S5 and S6 is controlled, and accordingly it is also possible to use a commercial PWM control IC etc. In the above described example, the AC switches S5 and S6 have been duty cycle controlled, but it is also possible, for example, to duty cycle control (PWM control) AC switches S1 and S3 and AC switches S2 and S4 in either direction, or in both directions, and the same effects can also be obtained in this case.

FIG. 8 is a drawing showing waveforms at each section of a fourth embodiment of the present invention. The main circuit structure of the fourth embodiment is the same as the circuit of FIG. 1, and description thereof will be omitted. In this example, waveforms at each of the points N1 and N2 are the same as those in FIG. 6, but with respect to the waveform at node N3, when the AC waveform is reconstituted the pulse amplitude of high frequency components has double peaks (positive side and negative side). As a result, the waveform at node N4 that has passed through the output filter 2 becomes a signal waveform having balanced pulse amplitude appearing at the positive and negative sides at node N3, namely a voltage value of a difference between positive and negative. That is, by varying the phase of control signals for the AC switches S5 and S6 with respect to the phase of control signals of the AC switches S1–S4 (by delay or advance), the operation of the AC switches S1 and S3, and the operation of the AC switches S2 and S4 are changed while the AC switches S5 and S6 are ON, and an output voltage appears on the positive side and the negative side. Here, compared to PWM, this type of phase control is known as a PPM (pulse phase modulation) method. Accordingly, for example, when the control signals of the AC switches S5 and S6 are delayed by 90° with respect to the phase of the control signals of the AC switches S1–S4, a pulse voltage appearing at node N3 will have equal amplitude in positive and negative directions, and equal pulse width and the average value is zero.

Figure 9A:
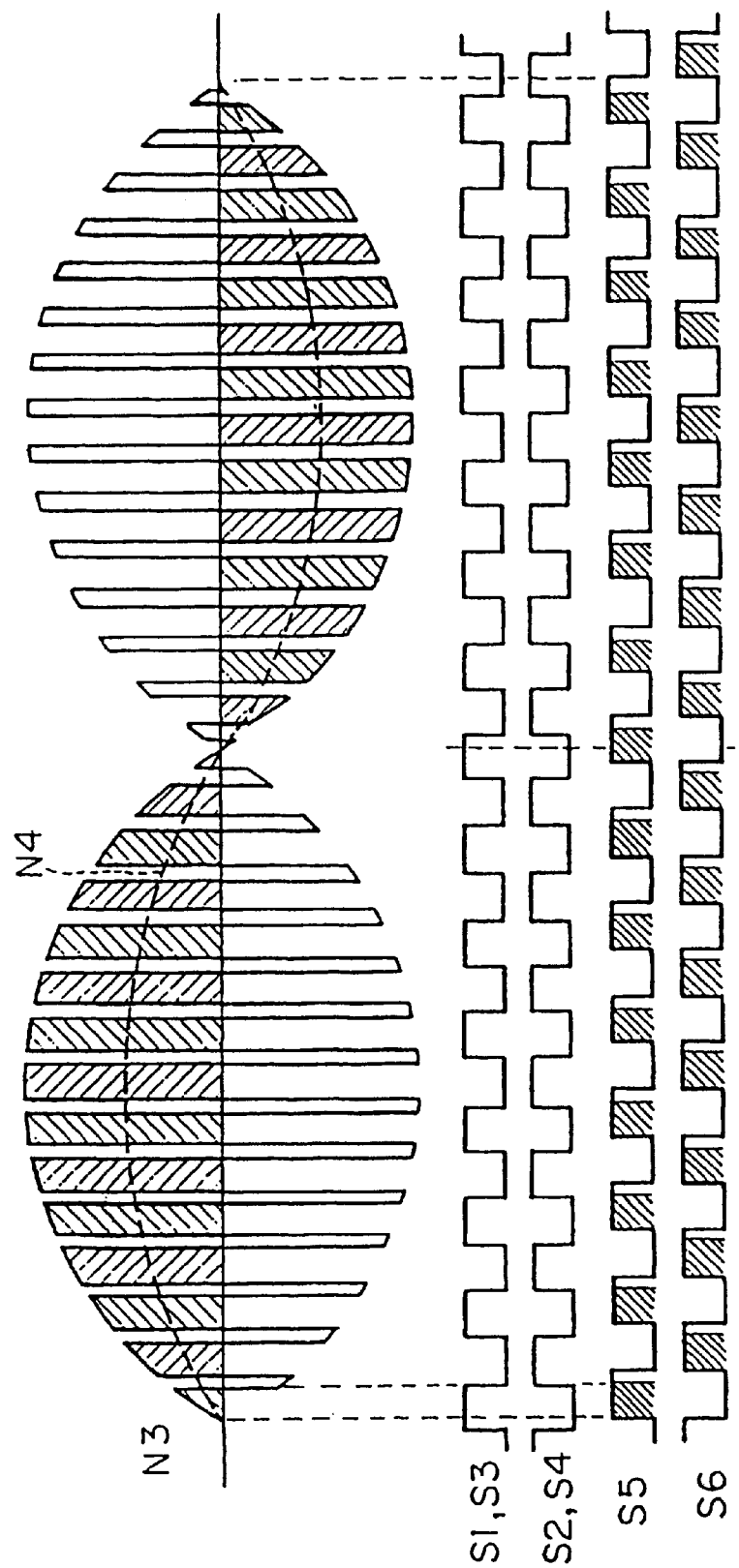
FIG. 9A is a drawing showing control signals of each of the AC switches for the operation of FIG. 8.

FIG. 9A is a drawing showing the relationship between control signals of the control means 3 for carrying out the above described operation and the waveform at node N3. The waveform shown by a dotted line overlapping the waveform at node N3 is the output waveform at node N4. In this example, a waveform is shown for the case where the phase of control signals of the AC switches S5 and S6 has been delayed by 45° with respect to the control signals of AC switches S1–S4. As is clear from the drawing, for example, in the first period that the AC switch S5 is ON there is a switch from AC switches S1 and S3 to AC switches S2 and S4, and at node N3 part of a pulse waveform appears from the positive side to the negative side. Further, when the phase of the control signals of the AC switches S5 and S6 is delayed between 90° and 180° the waveform of FIG. 9A has a positive side pulse waveform narrower than the negative side and a waveform at node N4 that has passed through the output filter 2 has its phase inverted if it is an alternating waveform, or its polarity reversed if it is a direct current. That is, when the phase of control signals of the AC switches S5 and S6 is caused to vary continuously from 0°–180°, it is possible to obtain an output that is continuous from a maximum positive phase value, through zero (90°) to a maximum negative phase value. Also, in the case of direct current output, it is possible to continuously vary from a maximum positive DC voltage, through a zero voltage to a maximum negative DC voltage.

Figure 9B:
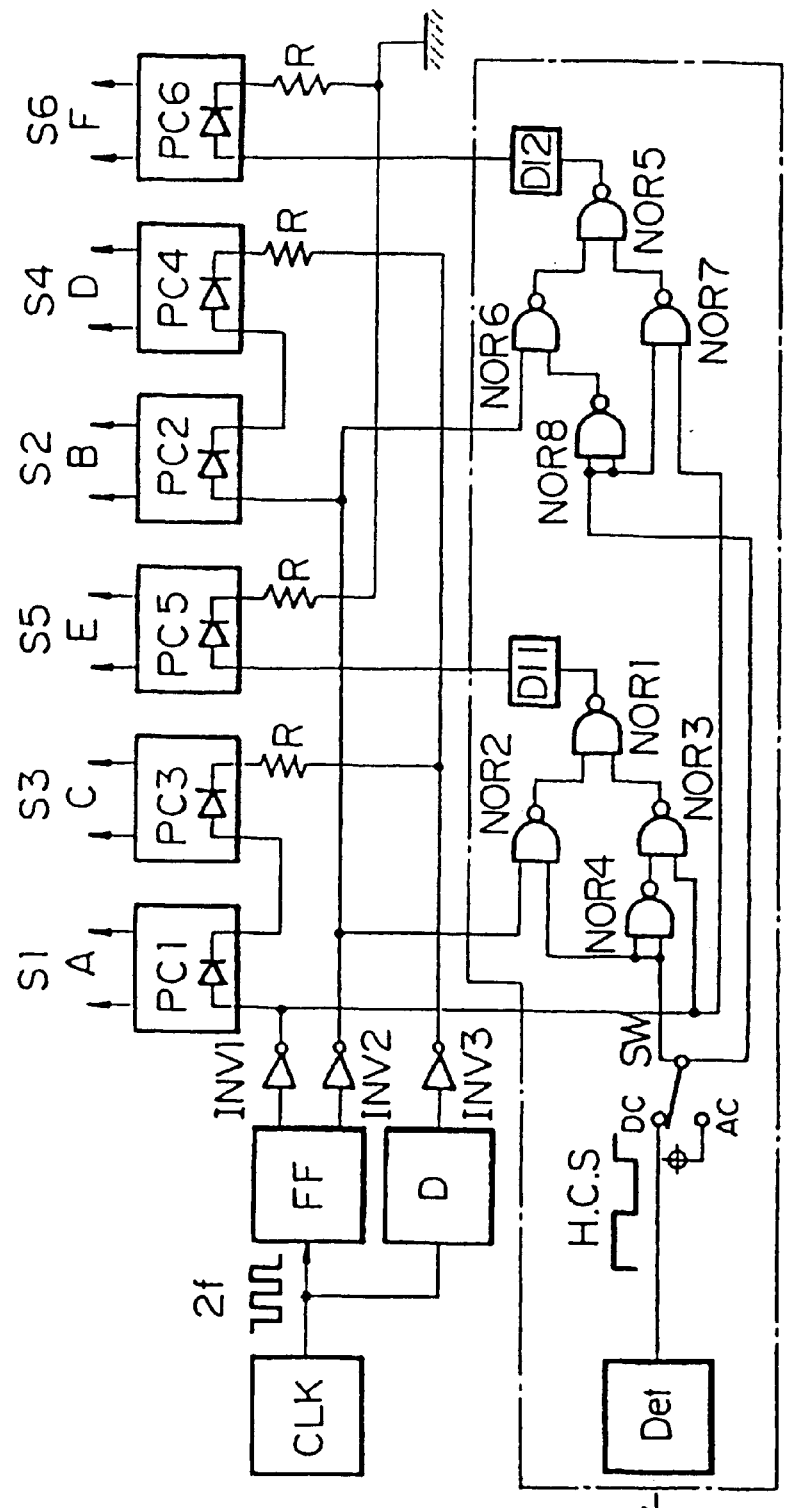
FIG. 9B is a block diagram showing a specific structural example of control means for generating PPM control signals such as those shown in FIG. 9A.

FIG. 9B is a drawing showing a structural example of a control means 3 for supplying the above described control signals, and has cathode sides of the photo coupler PC5 and the photo coupler PC6 connected to ground through a resistor R. With this type of structure, outputs from the photo coupler PC5 and the photo coupler PC6 can be changed in phase only without being affected by outputs from the D-type flip-flop D, and without changing the ON/OFF periods (waveform) using the detectors D11 and D12. The rest of the structure is the same as that in the circuit of FIG. 5B, and description thereof will be omitted.

Figure 10:
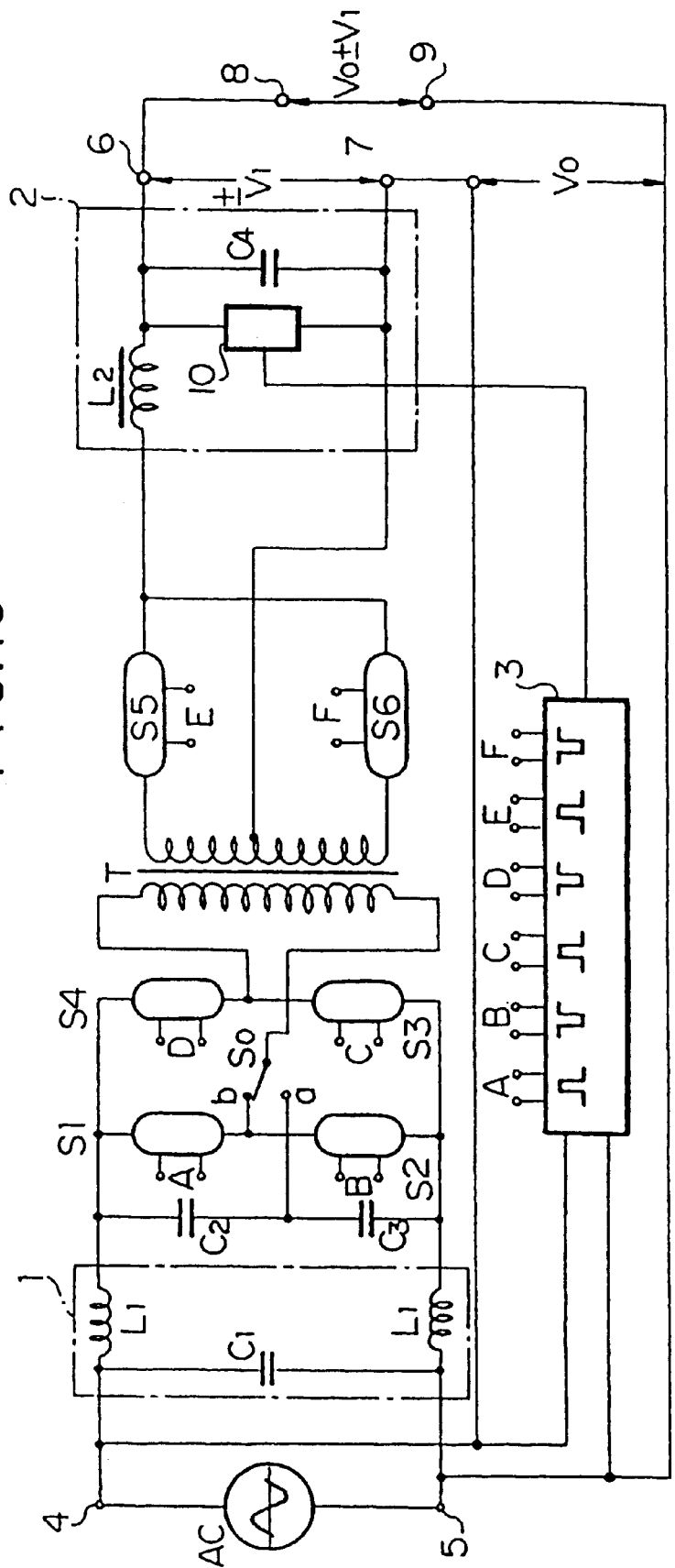
FIG. 10 is a circuit diagram showing the basic structure of an AC/AC converter of a fifth embodiment of the present invention.

FIG. 10 shows a fifth embodiment of the present invention, in which the circuit of FIG. 1 is modified such that one end 4 of an input is connected to the other end (7), thereby constituting a circuit for extracting an output from a terminal 8 connected to one end 6 of the output and a terminal 9 connected to another end 5 of the input. In this way, by applying input AC to the output of the circuit of FIG. 5B the following voltage operation becomes possible. For example, by varying the phase of the control signals of the AC switches S5 and S6 from 0°–360° in the case of PWM control or from 0°–180° in the case of PPM control, an AC voltage appearing between the terminals 6 and 7 is varied from a maximum positive phase value through zero to a maximum negative phase value. Accordingly, if this variable output is V1, the overall output V for an AC input voltage of V0 can be continuously varied according to the following equation.

$$V=V0 \pm V1$$

An integration regulator has the same function, but according to the present invention the capacitance and size can be made exceptionally small, and phase variation from input to output does not occur, making the device of the present invention excellent.

Figure 11:
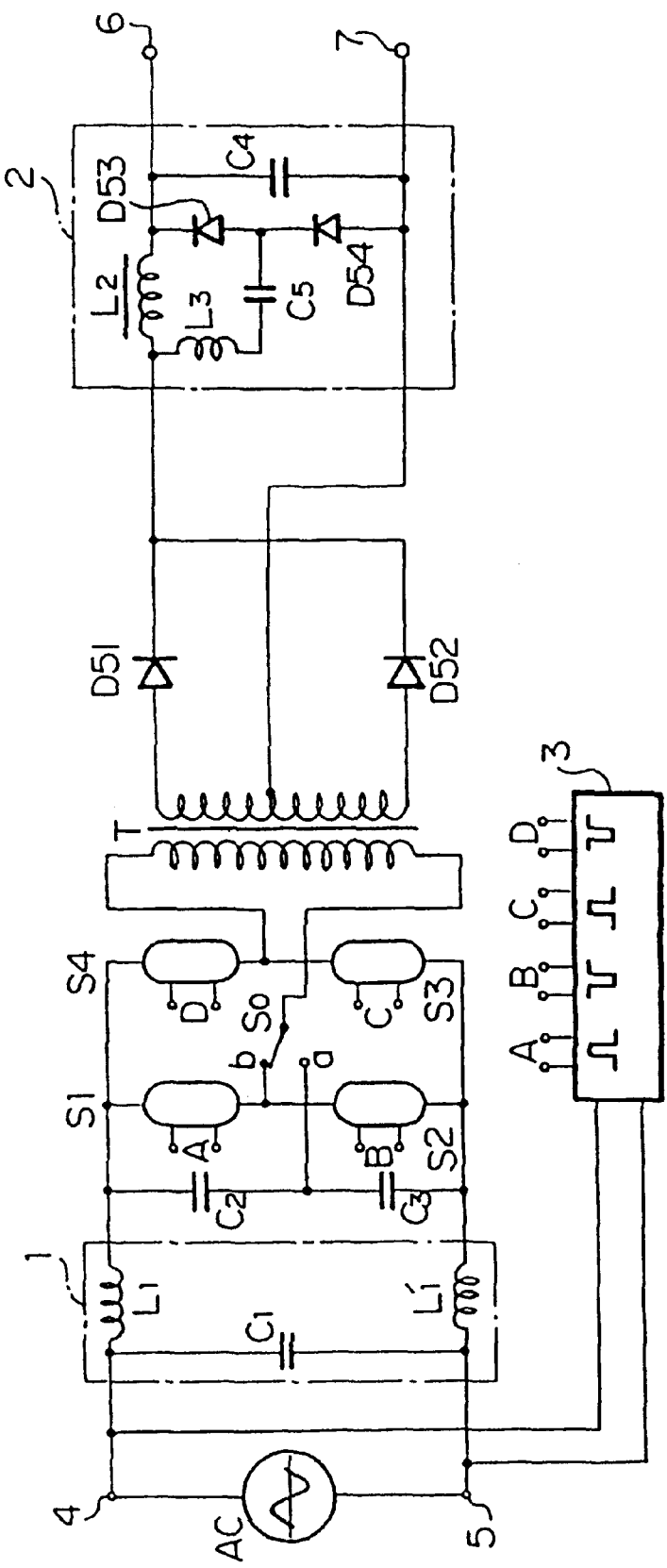
FIG. 11 is a circuit diagram showing the basic structure of an AC/AC converter of a sixth embodiment of the present invention.
Figure 12:
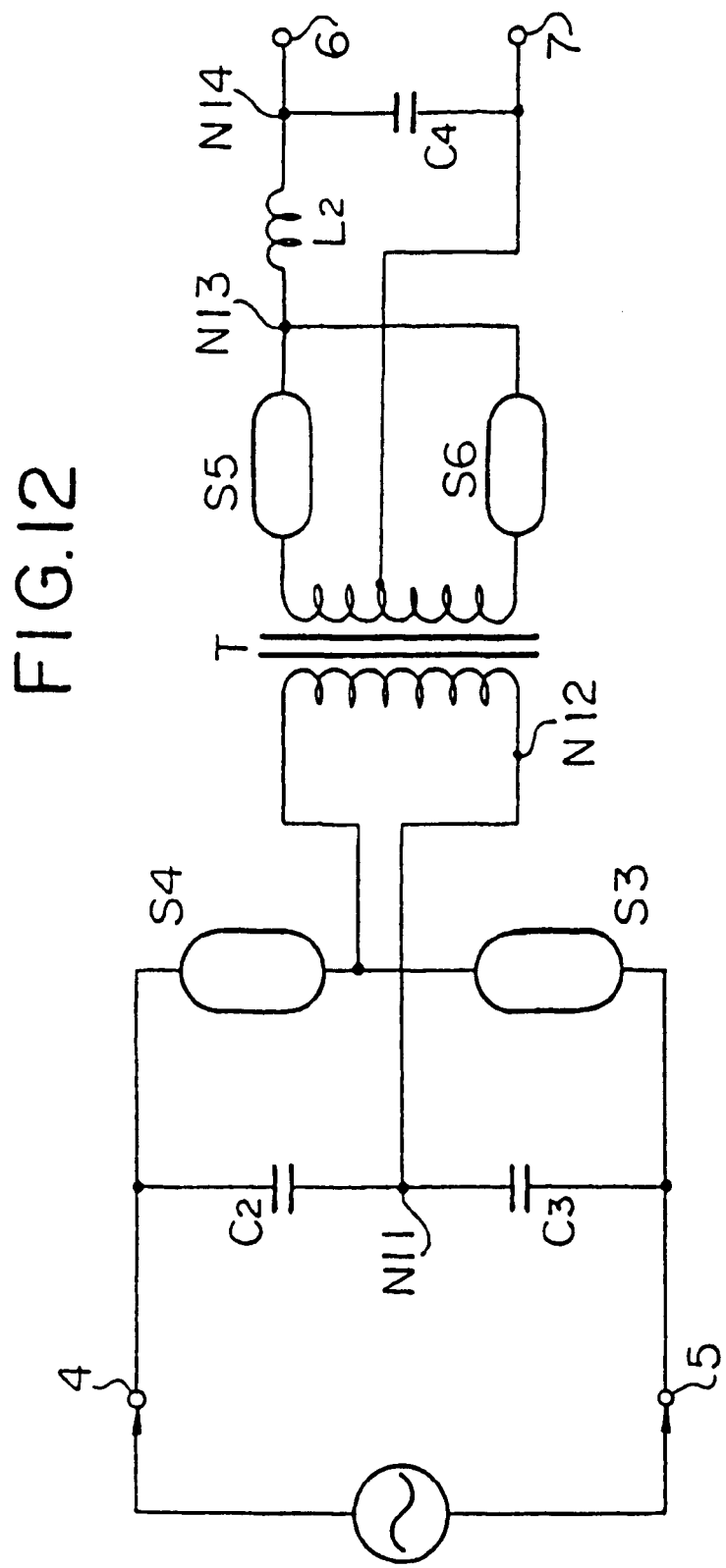
FIG. 12 is a drawing showing a first circuit for monitoring the waveforms of each section of the AC/AC converters of the present invention.
Figure 13A:
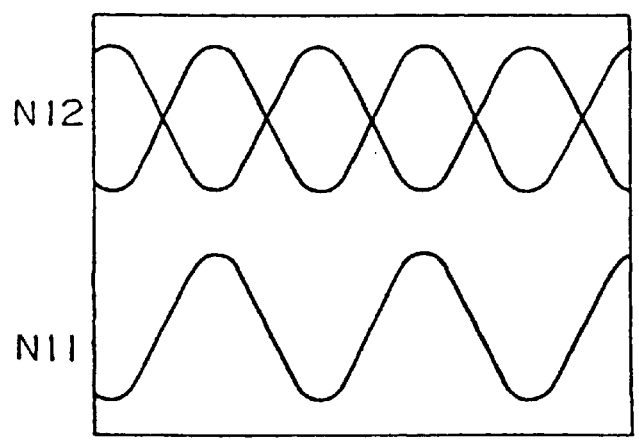
FIG. 13A is a drawing showing waveforms at node N11 and N12 in the circuit of FIG. 12.
Figure 13B:
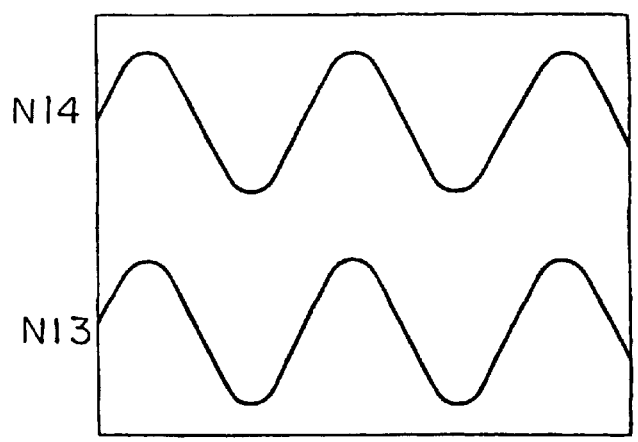
FIG. 13B is a drawing showing waveforms at node N13 and N14 in the circuit of FIG. 12.
Figure 13C:
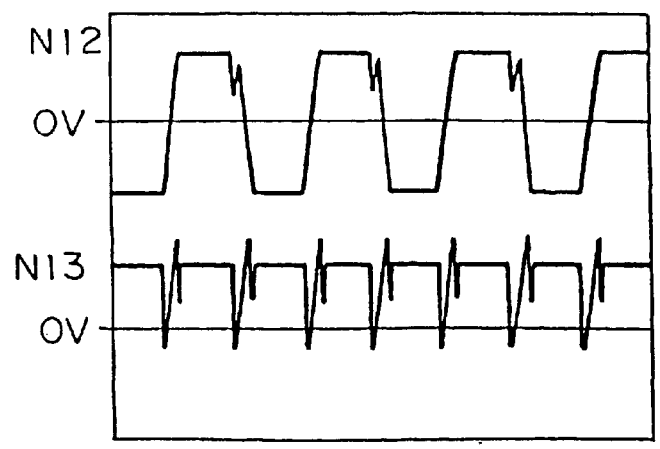
FIG. 13C is a drawing showing waveforms at node N12 and N13 in the circuit of FIG. 12, with the frequency range expanded.

FIG. 11 is a circuit diagram of a sixth embodiment of the present invention, and has diodes D51 and D52 acting as a full wave rectifying circuit replacing the AC switches S5 and S6 of the circuit in FIG. 1A. This is a device for DC only. Also, diodes D53 and D54 are provided, inversely connected in series across another end of the inductor L2 of the output filter 2 and another of the output terminals 7, a series circuit comprising an inductor L3 and a capacitor C5 is connected across a center point of the two diodes D53 and D54 and another end of the inductor L2, and output ripple is reduced. Using this type of structure, it is possible to make a device smaller and lighter in weight, and to reduce the number of components. The voltage rectification in this case can be duty cycle control of the control signals of the AC switches S1 and S3, and the AC switches S2 and S4.

Next, a description will be given for FIG. 12–FIG. 15 showing a test circuit and measurement results of the test circuit for an AC/AC converter of the present invention. For the test circuit having the structure shown in FIG. 12, waveforms at each of the nodes N11–N14 when the switching frequency is approximately 20 kHz are shown in FIG. 13A, FIG. 13B and FIG. 13C. The lower part of FIG. 13A is a waveform at node N11 while the upper half is a waveform at node N12 after being switched by AC switches S3 and AC switch S4. The lower part of FIG. 13B is the waveform at node N13, and although it is not clear from the drawing it actually includes high frequency components. The upper part of FIG. 13B is a waveform at node N14, and high frequency components have been removed by the inductor L2 and the capacitor C4. The upper part of FIG. 13C is a waveform at node N12 with the frequency range expanded, for showing the situation when being modulated at high frequency. The lower part of FIG. 13C is the waveform at node N13 for showing the situation where the waveform of the upper part of FIG. 13C is modulated on the same polarity side (positive side) by the AC switches S5 and S6.

Figure 14:
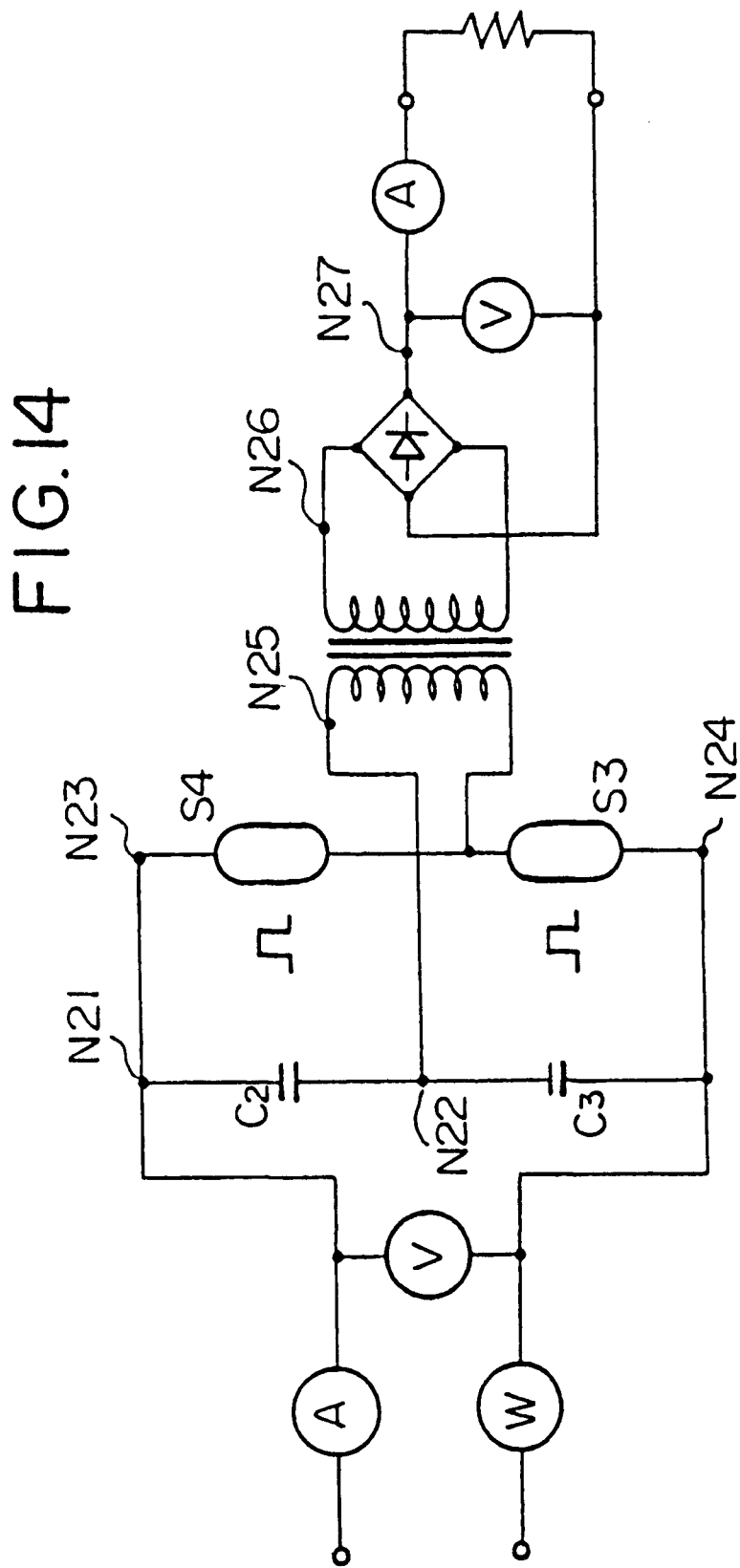
FIG. 14 is a drawing showing a second circuit for monitoring the waveforms of each section of the AC/AC converters of the present invention.
Figure 15C:
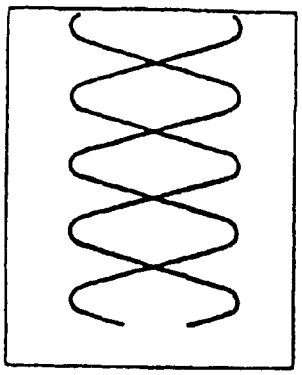
FIG. 15C is a drawing showing waveforms at node N25 and N26 in the circuit of FIG. 14.
Figure 15B:
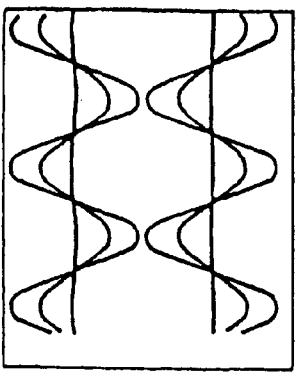
FIG. 15B is a drawing showing waveforms at node N23 and N24 in the circuit of FIG. 14.
Figure 15A:
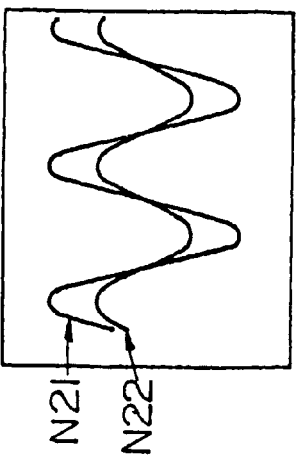
FIG. 15A is a drawing showing waveforms at node N21 and N22 in the circuit of FIG. 14.
Figure 15F:
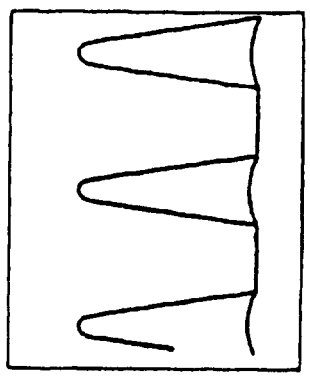
FIG. 15F is a drawing showing waveforms between drain and source of AC switches S3 and S4 in the circuit of FIG. 14.
Figure 15E:
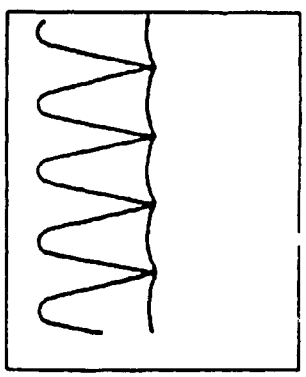
FIG. 15E is a drawing showing the waveform at node N27 in the circuit of FIG. 14.
Figure 15D:
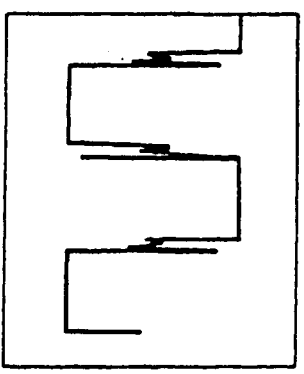
FIG. 15D is a drawing showing the waveforms of node N23 and N24 in the circuit of FIG. 14, with the frequency range expanded.

Waveforms at nodes N21–N27 in the direct current output test circuit of FIG. 14 are shown in FIGS. 15A–FIG. 15F. FIG. 15A shows the waveforms at node N21 and node N22, with the waveform of node N22 being voltage divided by the capacitors C2 and C3 to become ½ of the waveform at node N21. The upper part and the lower part of FIG. 15B respectively show waveforms at nodes N23 and N24, and it will be understood that an input AC waveform is switched at high frequency to the positive side or the negative side by operation of the corresponding AC switch S4 or S3. FIG. 15C shows waveforms at nodes N25 and N26 of the primary winding or secondary winding of the transformer 1, and shows high frequency conversion by the AC switches S3 and S4 to give upper and lower waveforms. FIG. 15D shows an enlarged frequency range of a voltage waveform that has been modulated at high frequency (20 kHz) by the AC switches S3 and S4. FIG. 15E shows waveform; of node N27 which is the waveform of node N26 after it has been rectified. FIG. 15F shows the voltage between the source and drain of MOSFETs which are semiconductor elements of the AC switches S3 and S4.

Figure 16A:
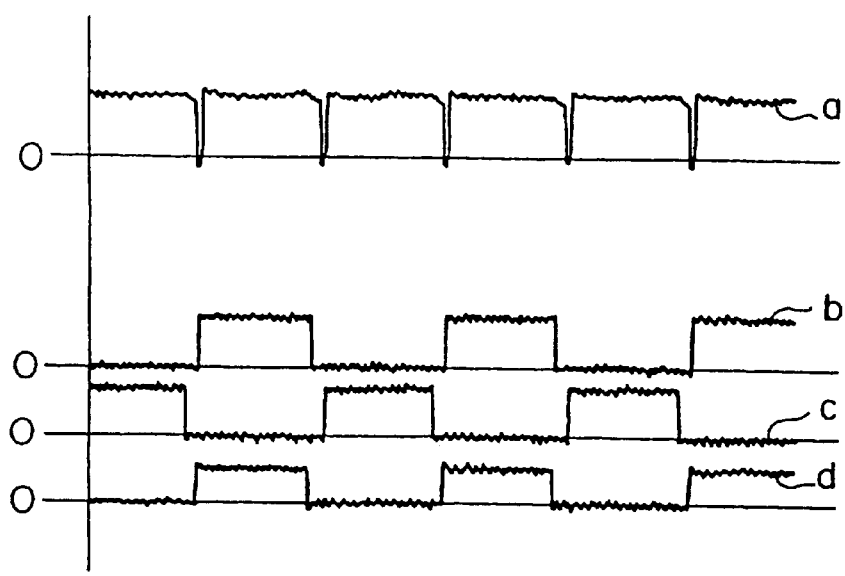
FIG. 16A is a drawing of waveforms observed at each section when PPM control is carried out by control means shown in FIG. 9B in the circuit of FIG. 1, when a phase delay is 0°.
Figure 16B:
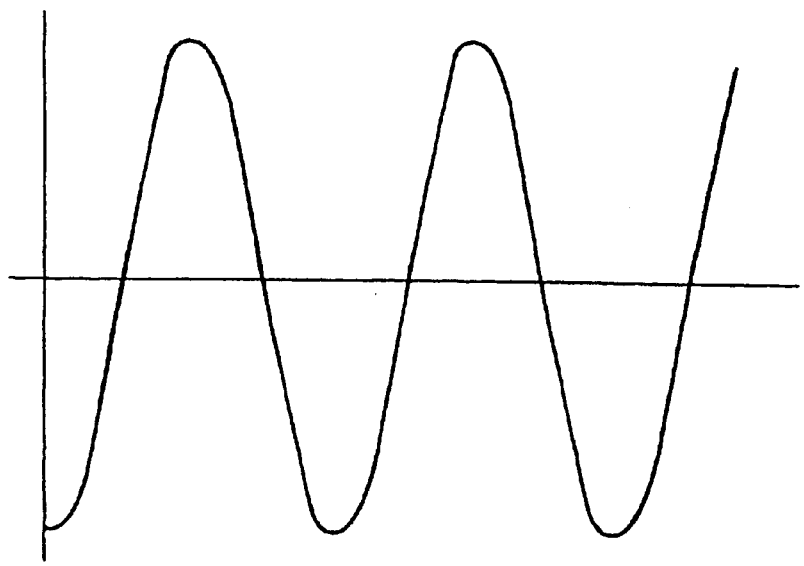
FIG. 16B is a waveform diagram of an output signal in the case of FIG. 16A.
Figure 17A:
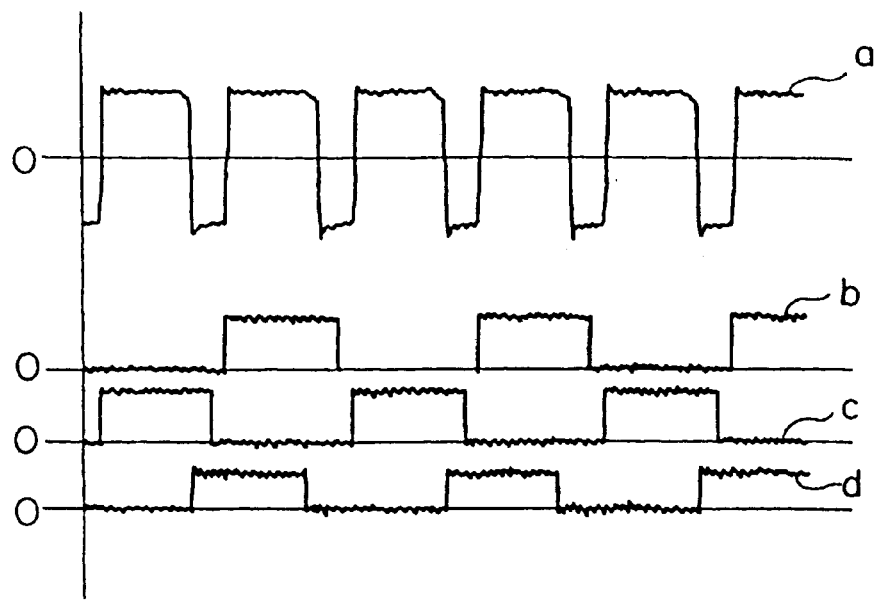
FIG. 17A is a drawing of waveforms observed at each section when PPM control is carried out by control means shown in FIG. 9B in the circuit of FIG. 1, when a phase delay is 45°.
Figure 17B:
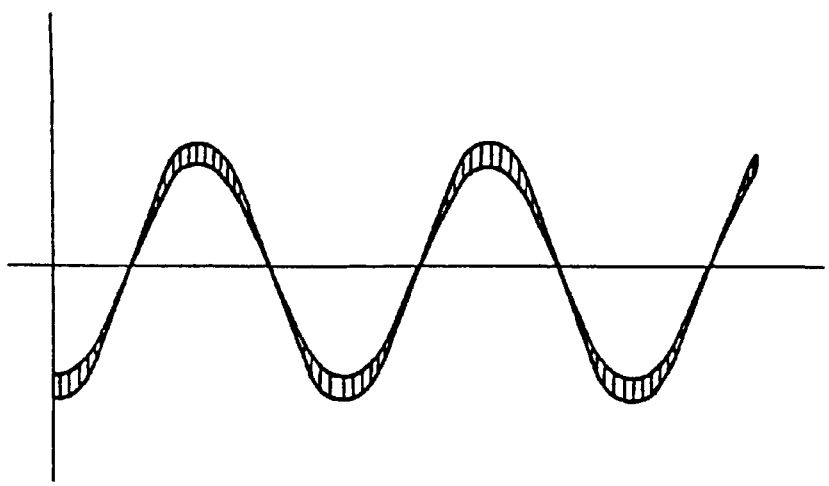
FIG. 17B is a waveform diagram of an output signal in the case of FIG. 17A.

FIG. 16A is a waveform diagram of waveforms measured at each section when PPM control has been carried out by the control means shown in FIG. 9B and the circuit of FIG. 1. In FIG. 16A, a is a drawing of the input waveform at node N2 when the frequency range is enlarged, b is a control signal for AC switch S5, c is a control signal for AC switch S6, and d is a control signal for AC switches S1–S4. In the case of FIG. 16A, the control signal for AC switch S5 (inverted AC switch S6) and the control signal for AC switches S1–S4 have substantially the same phase, which means that the output voltage waveform becomes an AC waveform having maximum voltage in the positive phase, as shown in FIG. 16B. Similarly, FIG. 17A is a waveform diagram of waveforms measured at each section when PPM control has been carried out by the control means shown in FIG. 9B and the circuit of FIG. 1. In FIG. 17A, the reference numerals are the same as in FIG. 16A and description is omitted. In this case, the control signal for AC switch S5 (inverted control signal for AC switch S6) is delayed by approximately 45° with respect to the control signal for the AC switches S1–S4. As a result, the output voltage waveform becomes an AC voltage waveform with a level of 50% compared to the maximum voltage in the positive phase, as shown in FIG. 17B.

Figure 18A:
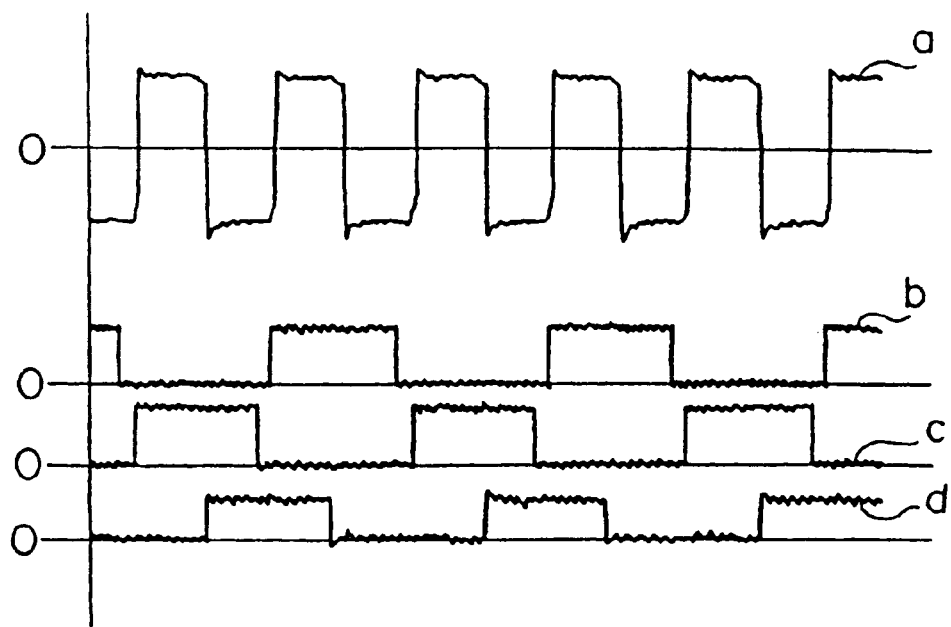
FIG. 18A is a drawing of waveforms observed at each section when PPM control is carried out by control means shown in FIG. 9B in the circuit of FIG. 1, when a phase delay is 90°.
Figure 18B:
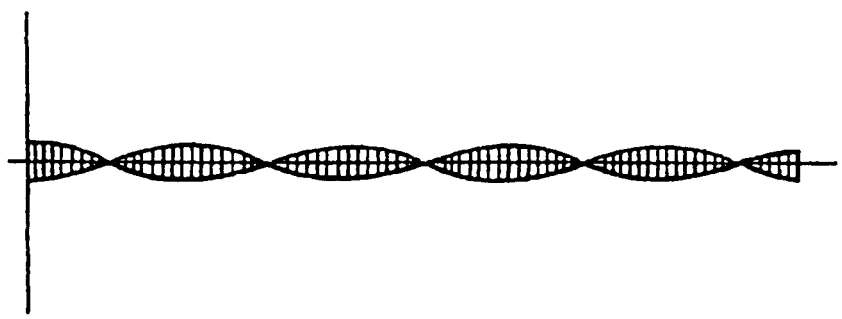
FIG. 18B is a waveform diagram of an output signal in the case of FIG. 18A.

Similarly, FIG. 18A is a waveform diagram of waveforms measured at each section when PPM control has been carried out by the control means shown in FIG. 9B and the circuit of FIG. 1. In FIG. 15A, the reference numerals are the same as in FIG. 16A and description is omitted. In this case, the control signal for AC switch S5 (inverted AC switch S6) is delayed by approximately 90° with respect to the control signals for the AC switches S1–S4. As a result, the output voltage waveform becomes substantially zero, as shown in FIG. 18B. The waveform that appears longitudinally symmetrical in FIG. 18B is a noise component, and the average voltage is substantially zero volts.

Figure 19A:
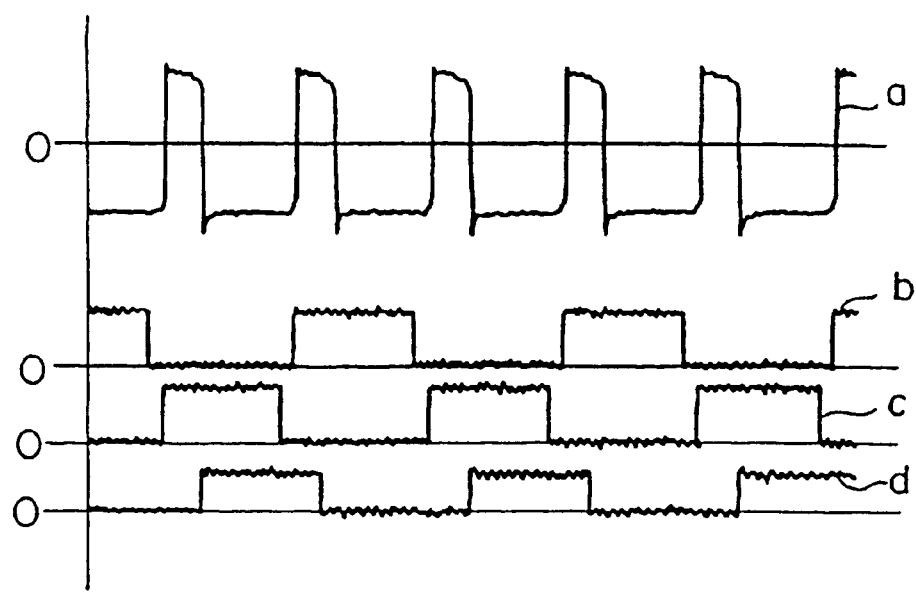
FIG. 19A is a drawing of waveforms observed at each section when PPM control is carried out by control means shown in FIG. 9B in the circuit of FIG. 1, when a phase delay is 135°.
Figure 19B:
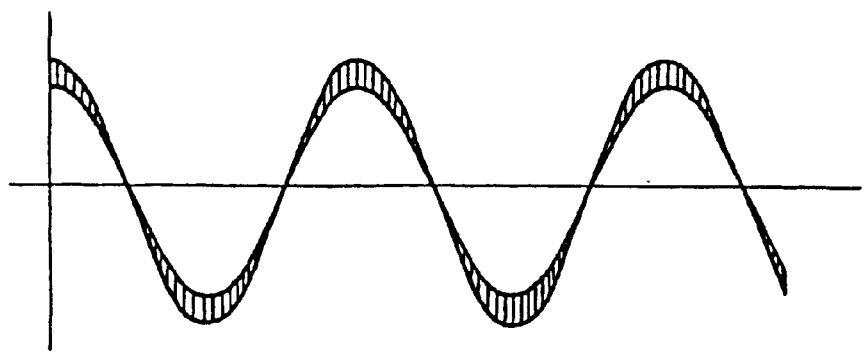
FIG. 19B is a waveform diagram of an output signal in the case of FIG. 19A.

Similarly, FIG. 19A is a waveform diagram of waveforms measured at each section when PPM control has been carried out by the control means shown in FIG. 9B and the circuit of FIG. 1. In FIG. 19A, the reference numerals are the same as in FIG. 16A and description is omitted. In this case, the control signal for AC switch S5 (inverted AC switch S6) is delayed by approximately 135° (advanced by 45°) with respect to the control signals for the AC switches S1–S4. As a result, the output voltage waveform becomes an AC voltage waveform with a level of 50% compared to the maximum voltage in the negative phase, as shown in FIG. 19B.

Figure 20A:
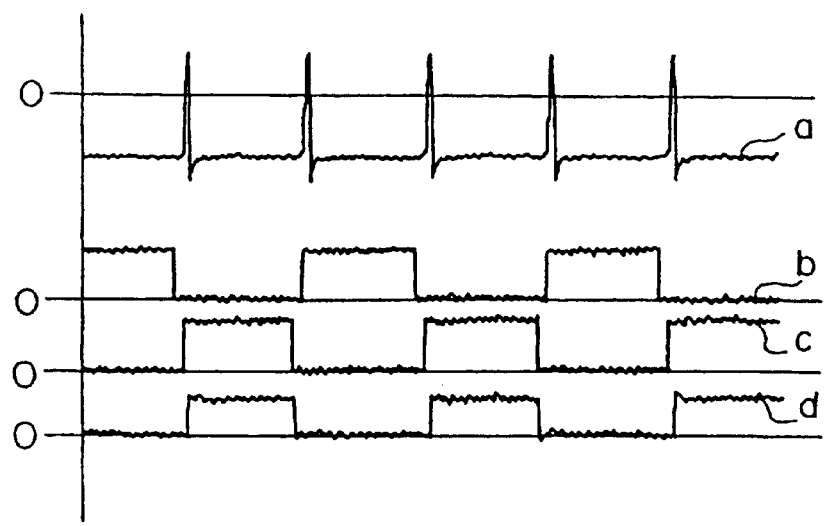
FIG. 20A is a drawing of waveforms observed at each section when PPM control is carried out by control means shown in FIG. 9B in the circuit of FIG. 1, when a phase delay is 180°.
Figure 20B:
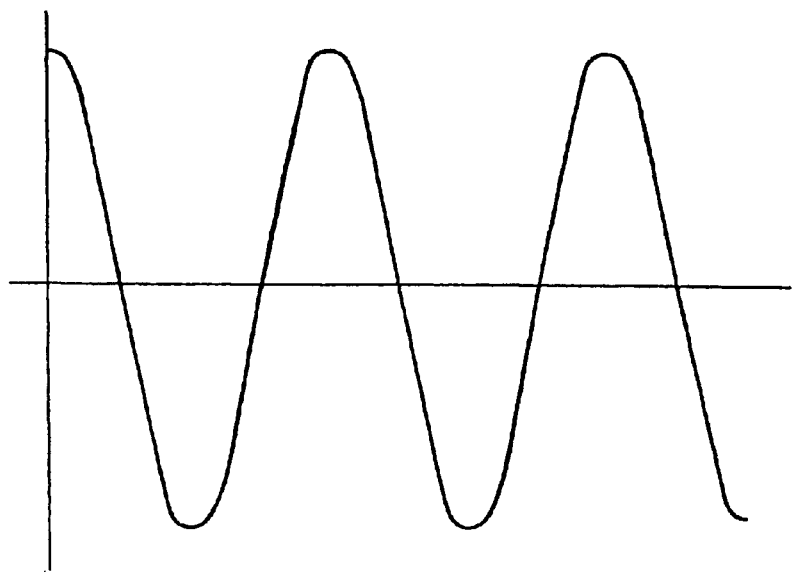
FIG. 20B is a waveform diagram of an output signal in the case of FIG. 20A.
Figure 21:
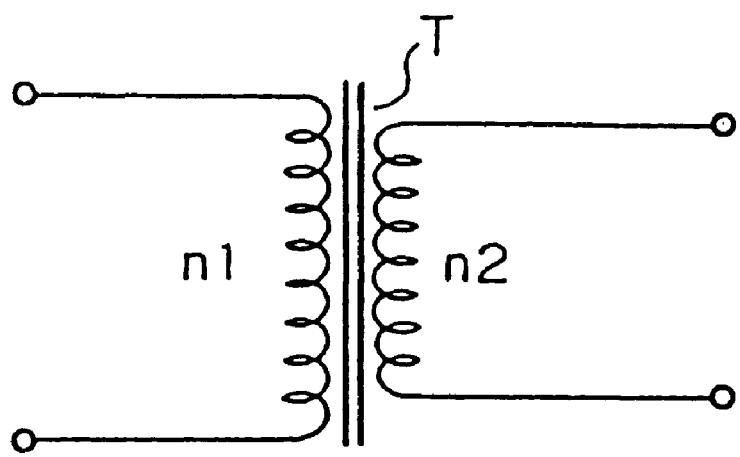
FIG. 21 is a drawing showing a transformer being a conventional transformer.
Figure 22:
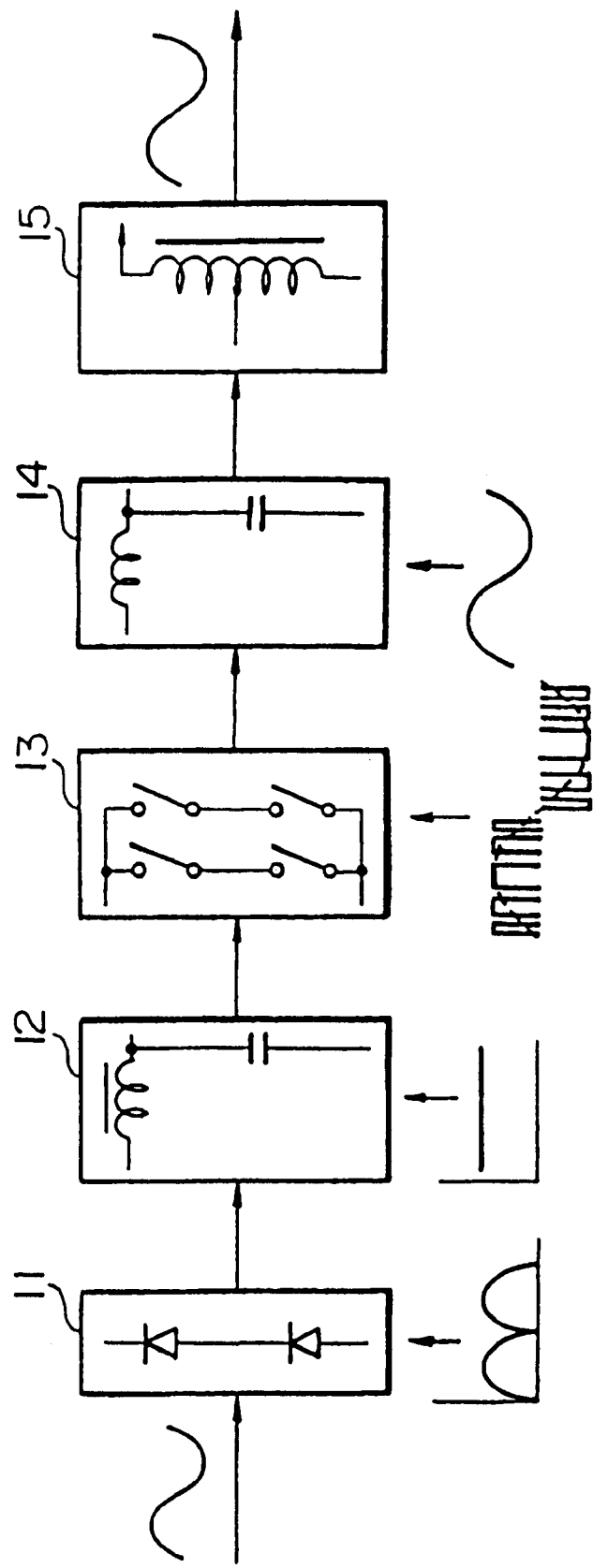
FIG. 22 is a block diagram showing the structure of an AC power supply device using a conventional inverter.
Figure 23:
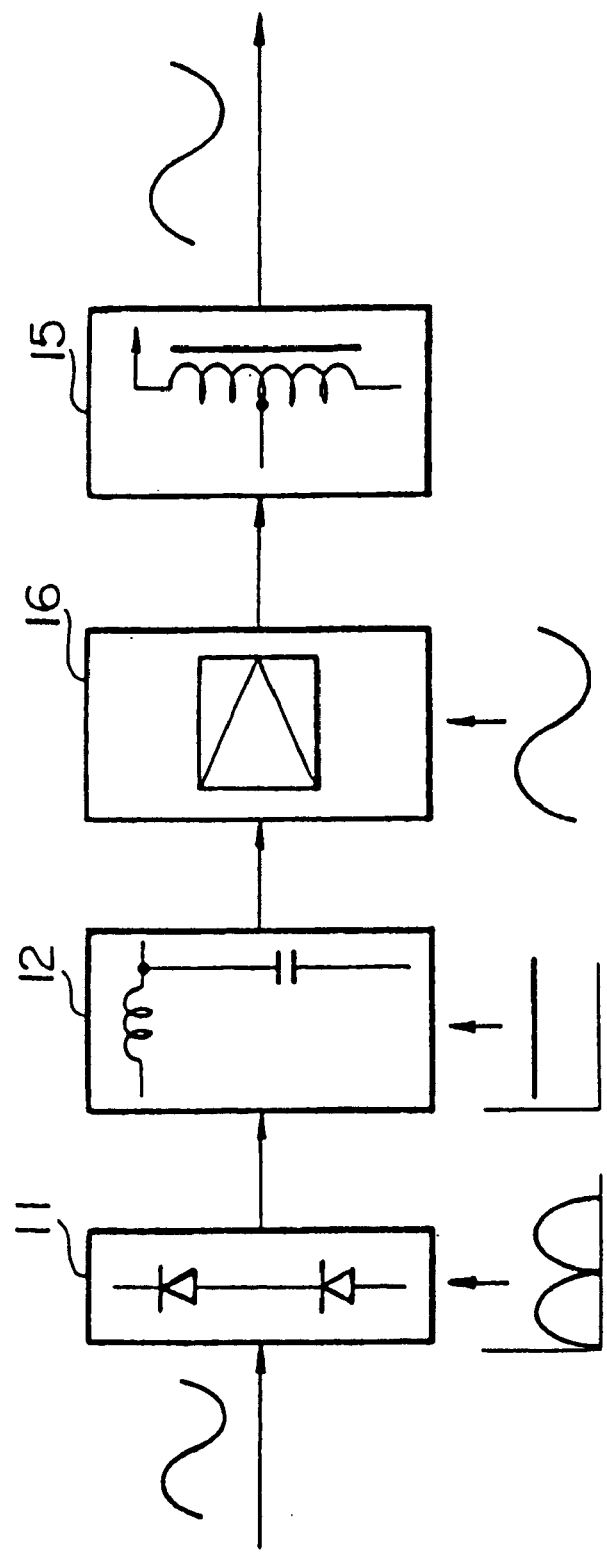
FIG. 23 is a block diagram showing the structure of an AC power supply device using a conventional power amplifier.

Similarly, FIG. 20A is a waveform diagram of waveforms measured at each section when PPM control has been carried out by the control means shown in FIG. 9B and the circuit of FIG. 1. In FIG. 20A, the reference numerals are the same as in FIG. 16A and description is omitted. In this case, the control signal for AC switch S6 (inverted AC switch S5) is substantially synchronous with the control signals for the AC switches S1–S4. That is, it becomes phase inverted compared to the case of FIG. 16A. As a result, the output voltage waveform becomes an AC waveform having maximum voltage in the negative phase, as shown in FIG. 20B.

According to the present invention as has been described above, an input AC supply is converted to high frequency by AC switches using semiconductor elements, and following that is rectified back to a waveform approximating to or resembling the input waveform, which means that:

(1) since the transformer T operates at high frequency the capacity can be made small, and a device overall can be made small and light weight;

(2) an output waveform is a waveform closely following or resembling the input waveform, and there is hardly any harmonic distortion;

(3) AC and DC outputs can be simply switched at the same output terminal;

(4) the circuit structure is simple compared to an AC power supply device using conventional semiconductor elements, reliability is improved and power supply efficiency and power factor are improved;

(5) it is possible to obtain an arbitrary voltage continuously from around zero to a fixed maximum voltage value;

(6) further, a single phase AC/AC converter of the present invention uses two circuits, and by using open-delta connection it can be simply applied to a three phase circuit.

Various other effects are achieved.

What is claimed is:

1. An AC/AC-DC converter, comprising:
   a) a first pair of AC switches including first and second AC switches that are connected in series with each other;
   b) a second pair of AC switches including third and fourth AC switches that are connected in series with each other;
   c) an AC input across which the first and second pair of AC switches are connected in parallel with each other;
   d) a third pair of AC switches including fifth and sixth AC switches that are connected in series with each other;
   e) a first output formed by connecting ends of the fifth and sixth AC switches;
   f) a transformer having:
      1) a primary winding connected between (i) a connecting point between the first and second AC switches and (ii) a connecting point between the third and fourth AC switches; and
      2) a secondary winding across which the third pair of AC switches is connected, the secondary winding having a center point constituting a second output;
   g) control means for causing alternate operation of (i) the first, third and fifth AC switches and (ii) the second, fourth and sixth AC switches, at a frequency higher than an input waveform;
   h) first and second capacitors that are connected in series across the AC input, closer to the AC input than are the pairs of AC switches; and
   i) switching means for switching connection of a terminal of the primary winding between (i) the connecting point between the first and second AC switches and (ii) a connecting point between the first and second capacitors;

wherein, when an AC input having a positive phase and a negative phase is applied, an output AC voltage is controlled to have a value in a range from a maximum value of the positive phase, passing through zero, to a maximum value of the negative phase by using pulse phase modulation between the first and second pairs of AC switches and the third pair of AC switches; and wherein, when a DC input is applied, an output DC voltage can be continuously varied to have a value in a range from a maximum value of positive polarity, passing through zero, to a maximum value of negative polarity, by phase controlling a driving pulse phase of the first, second and third pairs of AC switches between 0 and 180 degrees.

2. The AC/AC converter of claim 1, wherein at least one of the AC switches includes:
   first and second semiconductor devices having same-polarity terminals connected to each other and respective first and second gates that both receive a control signal; and
   first and second diodes connected across the respective first and second semiconductor devices in a direction inverse to the semiconductor devices' respective conducting directions.

3. The AC/AC converter of claim 1, wherein the control means includes:
   means for causing operation of the fifth and sixth AC switches to be reversed when the AC input moves between a positive and negative half-cycle.

4. The AC/AC converter of claim 1, wherein the control means includes:
   means for controlling respective duty cycles of the fifth and sixth AC switches.

5. The AC/AC converter of claim 1, wherein the control means includes:
   means for controlling respective pulse phases of the fifth and sixth AC switches.

6. The AC/AC converter of claim 1, wherein the control means includes:
   means for controlling duty cycles of either the first pair of AC switches or the second pair of AC switches.

7. The AC/AC converter of claim 1, wherein:
   a first output end constitutes a full-wave-rectified output of two ends of the secondary winding; and
   a second output end is the center point of the secondary winding.

8. The AC/AC converter of claim 1, wherein:
   an output of the AC/AC converter is combined with an AC input to provide a composite output.

9. The AC/AC converter of claim 1, wherein:
   plural AC/AC converters are applied to a three-phase circuit.

10. An AC-AC/DC converter comprising:
   a first AC switch and a second AC switch connected in series, and a third AC switch and a fourth AC switch connected in series, all of said switches being connected in parallel across a first end and a second end of an AC input;
   a transformer having a primary winding and a secondary winding, a first end of said primary winding connected between said first AC switch and said second AC switch, and a second end of said primary winding connected between said third AC switch and said fourth AC switch;
   a fifth AC switch having a first end and a second end, the first end connected to a first end of said secondary winding;

a sixth AC switch having a first end and a second end, said first end connected to a second end of said secondary winding;

a first end of an output formed by connecting said second end of said fifth switch and said second end of said sixth switch, and a second end of the output formed by a center point of said secondary winding;

control means for alternately operating, at a frequency higher than an input frequency, a first set of said first AC switch, said third AC switch and said fifth AC switch, and a second set of said second AC switch, said fourth AC switch and said sixth AC switch;

two capacitors connected in series and disposed at a position closer to said AC input than are said AC switches and between said first end and said second end of said AC input; and switching means for selectively connecting said first end of said primary winding to one of a connecting point of said two capacitors, and a connecting point of said first and second AC switches.

11. The AC-AC/DC converter as set forth in claim 11, wherein said control means reverses operation of said fifth AC switch and said sixth AC switch when the AC input shifts from a positive half cycle to a negative half cycle, or from a negative half cycle to a positive half cycle.

12. The AC-AC/DC converter as set forth in claim 11, wherein said control means performs pulse phase modulation control for said fifth AC switch and said sixth AC switch.

13. The AC-AC/DC converter as set forth in claim 11, wherein an AC output obtained by the converter is combined with an AC input to produce a composite output.

14. The AC-AC/DC converter as set forth in claim 11 wherein when an AC input having a positive phase and a negative phase is applied, an output AC voltage is controlled to have a value in a range from a maximum value of the positive phase, passing through zero, to a maximum value of the negative phase by using pulse phase modulation between the first, second, third and fourth AC switches and the fifth and sixth AC switches; and wherein, when a DC input is applied, an output DC voltage can be continuously varied to have a value in a range from a maximum value of positive polarity, passing through zero, to a maximum value of negative polarity, by phase controlling a driving pulse phase of said first, second, third, fourth, fifth and sixth AC switches between 0 and 180 degrees.

* * * * *